US008234584B2

(12) United States Patent
Motobayashi et al.

(10) Patent No.: US 8,234,584 B2
(45) Date of Patent: Jul. 31, 2012

(54) COMPUTER SYSTEM, INFORMATION COLLECTION SUPPORT DEVICE, AND METHOD FOR SUPPORTING INFORMATION COLLECTION

(75) Inventors: Masahiro Motobayashi, Kodaira (JP); Toshio Okochi, Tokyo (JP); Michiko Sakai, Ichikawa (JP); Maki Hayashi, Tokyo (JP); Akio Azuma, Urayasu (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 12/379,283

(22) Filed: Feb. 18, 2009

(65) Prior Publication Data

US 2010/0031178 A1 Feb. 4, 2010

(30) Foreign Application Priority Data

Jul. 30, 2008 (JP) ................................. 2008-196876

(51) Int. Cl.
*G06F 3/00* (2006.01)
*G06F 17/30* (2006.01)

(52) U.S. Cl. ........ 715/771; 715/764; 715/700; 715/789; 707/709; 707/710; 707/748; 707/749; 707/750

(58) Field of Classification Search .................... 715/771
See application file for complete search history.

(56) References Cited

U.S. PATENT DOCUMENTS

| | | | | |
|---|---|---|---|---|
| 6,034,942 A * | 3/2000 | Yoshio et al. | ............... | 369/275.3 |
| 6,185,558 B1 * | 2/2001 | Bowman et al. | ................ | 705/37 |
| 6,237,030 B1 * | 5/2001 | Adams et al. | ................. | 709/218 |
| 6,266,649 B1 * | 7/2001 | Linden et al. | ................. | 705/7.29 |
| 6,397,264 B1 * | 5/2002 | Stasnick et al. | ............... | 719/328 |
| 6,438,579 B1 * | 8/2002 | Hosken | ......................... | 709/203 |
| 6,721,744 B1 * | 4/2004 | Naimark et al. | ....................... | 1/1 |
| 6,738,678 B1 * | 5/2004 | Bharat et al. | .................... | 700/48 |
| 6,871,202 B2 * | 3/2005 | Broder | ................... | 1/1 |
| 6,912,505 B2 * | 6/2005 | Linden et al. | ............. | 705/14.53 |
| 7,065,532 B2 * | 6/2006 | Elder et al. | .......................... | 1/1 |
| 7,117,434 B2 * | 10/2006 | Novaes | ......................... | 715/272 |
| 7,158,966 B2 * | 1/2007 | Brill et al. | ............................ | 1/1 |
| 7,424,483 B2 * | 9/2008 | Ukai et al. | ........................... | 1/1 |
| 7,617,208 B2 * | 11/2009 | Baeza-Yates et al. | ................ | 1/1 |
| 7,660,815 B1 * | 2/2010 | Scofield et al. | ........ | 707/999.102 |
| 7,680,703 B1 * | 3/2010 | Smith | .......................... | 705/26.8 |

(Continued)

FOREIGN PATENT DOCUMENTS

JP 2000-331020 5/1999

(Continued)

*Primary Examiner* — William Bashore
*Assistant Examiner* — Reza Nabi
(74) *Attorney, Agent, or Firm* — Stites & Harbison, PLLC; Juan Carlos A. Marquez, Esq

(57) ABSTRACT

Provided is a computer system including an information providing server and a computer which is coupled to the information providing server, and which collects information, the computer being configured to: record status histories including a history of an operation to a screen which shows a status of the computer, and which is displayed on the computer in chronological order to constitute a set of the status histories; and divide, in a case where a history of an operation of switching the screen is detected from the set of the status histories, based on the history of the operation of switching the screen, the set of the status histories. Accordingly, when a user collects information, navigation information is provided by taking the fact that the user has actually reached useful information into consideration.

15 Claims, 18 Drawing Sheets

U.S. PATENT DOCUMENTS

| | | | |
|---|---|---|---|
| 7,685,209 B1 * | 3/2010 | Norton et al. | 707/803 |
| 7,693,817 B2 * | 4/2010 | Dumais et al. | 707/999.002 |
| 7,693,904 B2 * | 4/2010 | Choi et al. | 707/738 |
| 7,694,212 B2 * | 4/2010 | Fikes et al. | 715/200 |
| 7,734,632 B2 * | 6/2010 | Wang | 707/749 |
| 7,752,201 B2 * | 7/2010 | Anderson et al. | 707/731 |
| 7,774,335 B1 * | 8/2010 | Scofield et al. | 707/709 |
| 7,783,636 B2 * | 8/2010 | Church et al. | 707/732 |
| 7,792,842 B2 * | 9/2010 | Goto | 707/750 |
| 7,797,635 B1 * | 9/2010 | Denise | 715/738 |
| 7,802,197 B2 * | 9/2010 | Lew et al. | 715/789 |
| 7,809,716 B2 * | 10/2010 | Wang et al. | 707/721 |
| 7,831,476 B2 * | 11/2010 | Foster et al. | 705/26.8 |
| 7,912,458 B2 * | 3/2011 | Ramer et al. | 455/418 |
| 7,987,182 B2 * | 7/2011 | Slothouber et al. | 707/722 |
| 8,050,675 B2 * | 11/2011 | Ramer et al. | 455/432.2 |
| 8,131,271 B2 * | 3/2012 | Ramer et al. | 455/414.1 |
| 2002/0198882 A1 * | 12/2002 | Linden et al. | 707/10 |
| 2004/0236736 A1 * | 11/2004 | Whitman et al. | 707/3 |
| 2005/0210008 A1 * | 9/2005 | Tran et al. | 707/3 |
| 2006/0036565 A1 * | 2/2006 | Bruecken | 707/1 |
| 2006/0074883 A1 * | 4/2006 | Teevan et al. | 707/3 |
| 2006/0085447 A1 * | 4/2006 | D'Urso | 707/100 |
| 2007/0250784 A1 * | 10/2007 | Riley et al. | 715/764 |
| 2007/0288248 A1 * | 12/2007 | Rauch | 705/1 |
| 2008/0189253 A1 * | 8/2008 | Oliver et al. | 707/3 |
| 2009/0204599 A1 * | 8/2009 | Morris et al. | 707/5 |
| 2009/0204902 A1 * | 8/2009 | Morris et al. | 715/751 |
| 2009/0287687 A1 * | 11/2009 | Martire et al. | 707/5 |
| 2010/0057798 A1 * | 3/2010 | Zhang et al. | 707/722 |
| 2010/0114989 A1 * | 5/2010 | Cormode et al. | 707/808 |

FOREIGN PATENT DOCUMENTS

| | | |
|---|---|---|
| JP | 2003-296361 | 3/2002 |
| JP | 2004-348550 | 5/2003 |
| JP | 2003296361 A * | 10/2003 |
| JP | 2004348550 A * | 12/2004 |

* cited by examiner

| # | DATA ITEM | CONTENT |
|---|---|---|
| 1 | DATE AND TIME | DATE AND TIME OF OBTAINING STATUS LOG |
| 2 | WINDOW TITLE | TITLE OF WINDOW |
| 3 | URL | URL ACCESSED BY WEB BROWSER |
| 4 | WINDOW CLASS | TYPE OF WINDOW |
| 5 | MOUSE STATUS | MOUSE POSITION AT DATE AND TIME OF OBTAINING STATUS LOG, STATUS OR NUMBER OF TIMES OF BUTTON PRESSING, AND STATUS OF MOUSE WHEEL WITHIN CERTAIN TIME |
| 6 | KEYBOARD STATUS | TYPES OR NUMBER OF KEYS PRESSED WITHIN CERTAIN TIME |

*FIG. 4A*

| DATE AND TIME | WINDOW TITLE | URL | WINDOW CLASS | MOUSE STATUS | KEYBOARD STATUS |
|---|---|---|---|---|---|
| 2008/1/1 00:00:00 | "TITLE 1" | http://www.example.com | WEB BROWSER | MS1 | KB1 |
| 2008/1/1 00:00:01 | "TITLE 1" | http://www.example.com | WEB BROWSER | MS2 | KB2 |
| 2008/1/1 00:00:02 | "TITLE 2" | "" | TEXT EDITOR | MS3 | KB3 |
| 2008/1/1 00:00:03 | "TITLE 2" | "" | TEXT EDITOR | MS4 | KB4 |
| ... | ... | ... | ... | ... | ... |

*FIG. 4B*

| # | DATA ITEM | CONTENT |
|---|---|---|
| 1 | START DATE AND TIME | COMBINING START DATE AND TIME |
| 2 | END DATE AND TIME | COMBINING END DATE AND TIME |
| 3 | WINDOW TITLE | TITLE OF WINDOW |
| 4 | URL | URL ACCESSED BY WEB BROWSER |
| 5 | WINDOW CLASS | TYPE OF WINDOW |
| 6 | MOUSE CHANGING AMOUNT | CHANGING AMOUNT OF MOUSE STATUS FROM START DATE AND TIME TO END DATE AND TIME |
| 7 | KEYBOARD CHANGING AMOUNT | CHANGING AMOUNT OF KEYBOARD STATUS FROM START DATE AND TIME TO END DATE AND TIME |

*FIG. 6A*

| START DATE AND TIME | END DATE AND TIME | WINDOW TITLE | URL | WINDOW CLASS | MOUSE CHANGING AMOUNT | KEYBOARD CHANGING AMOUNT |
|---|---|---|---|---|---|---|
| 2008/1/1 00:00:00 | 2008/1/1 00:00:01 | "TITLE 1" | http://www.example.com | WEB BROWSER | dX1, dY1, dW1 | dK1 |
| 2008/1/1 00:00:02 | 2008/1/1 00:00:03 | "TITLE 2" | "" | TEXT EDITOR | dX2, dY2, dW2 | dK2 |
| ... | ... | ... | ... | ... | ... | ... |

*FIG. 6B*

| # | DATA ITEM | CONTENT |
|---|---|---|
| 1 | WINDOW TITLE COLUMN | TITLE COLUMN OF WINDOW |
| 2 | URL COLUMN | URL COLUMN ACCESSED BY WEB BROWSER |
| 3 | WINDOW CLASS COLUMN | COLUMN OF WINDOW TYPE |
| 4 | IMPORTANCE | IMPORTANCE OF INFORMATION COLLECTION WORK LOG SEQUENCE |
| 5 | IMPORTANCE COLUMN | IMPORTANCE OF EACH INFORMATION COLLECTION WORK LOG SEQUENCE |

FIG. 7A

| # | | WINDOW TITLE COLUMN | URL COLUMN | WINDOW CLASS COLUMN | IMPORTANCE COLUMN | IMPORTANCE |
|---|---|---|---|---|---|---|
| 1 | INFORMATION COLLECTION WORK LOG 1 | "TITLE 1" | http://www.example.com | WEB BROWSER | w1 | W1 |
| | INFORMATION COLLECTION WORK LOG 2 | "TITLE 2" | "" | TEXT EDITOR | w2 | |
| | ... | ... | ... | ... | ... | |
| 2 | | ... | ... | ... | ... | ... |

FIG. 7B

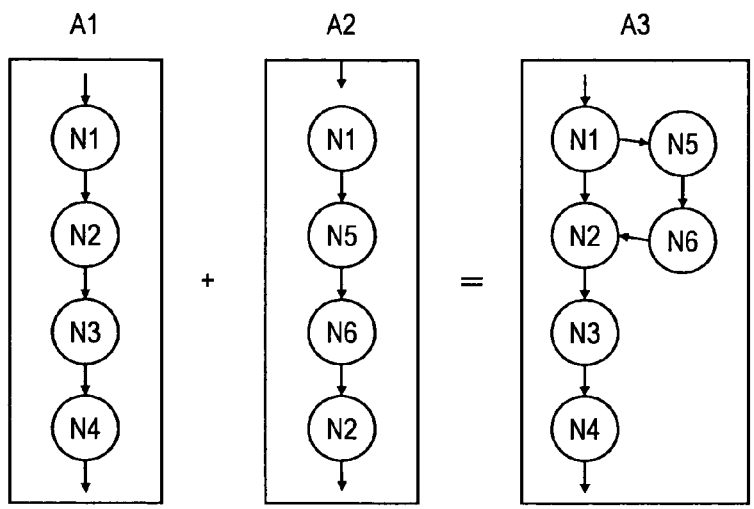
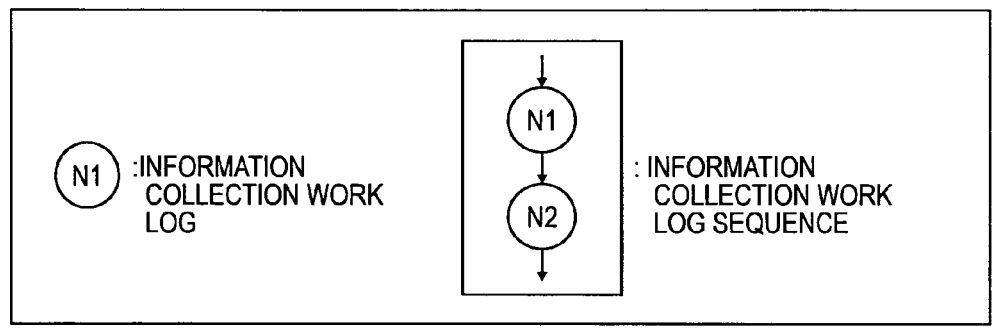
FIG. 12A
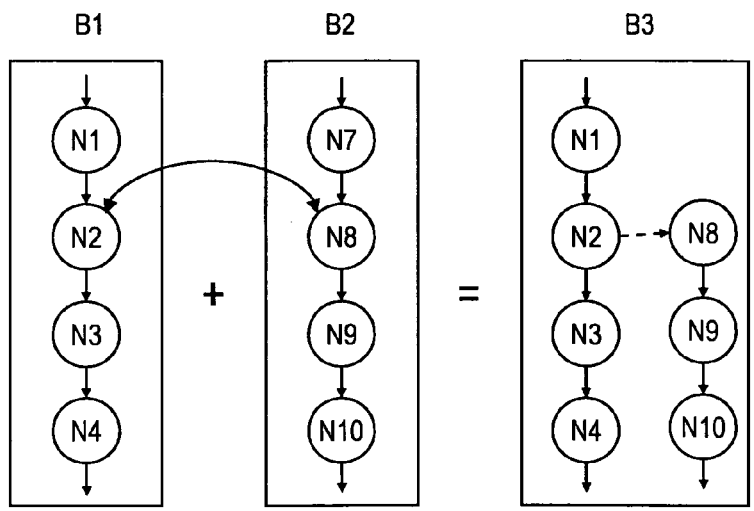
FIG. 12B

US 8,234,584 B2

COMPUTER SYSTEM, INFORMATION COLLECTION SUPPORT DEVICE, AND METHOD FOR SUPPORTING INFORMATION COLLECTION

CLAIM OF PRIORITY

The present application claims priority from Japanese patent application JP 2008-196876 filed on Jul. 30, 2008, the content of which is hereby incorporated by reference into this application.

BACKGROUND OF THE INVENTION

This invention relates to a technology of collecting information by using a computer.

In the case of collecting information by referring to, for example, a web page, methods of supporting information collection can be largely classified into the following three methods.

First, as the first method, there is a method of recommending a keyword, reference information, or the like used by many users. For example, behaviors of many users, such as a search keyword, purchase history, or information reference history, are extracted to be presented in order of frequency or other criteria.

As the second method, there is a method of showing a way to reach information currently accessed by a user. For example, JP 2003-296361 A discloses a technology of improving user's searching skill by presenting a route taken by other users to a page reached by the user.

As the third method, there is a method of showing a route for reaching target information by using other users' search history. For example, JP 2000-331020 A discloses a technology of providing information of high importance to the user by analyzing a search history based on a search word entered to a search site by the user and collating an analysis result with the search word during information search.

JP 2004-348550 A discloses a technology of dividing a search history according to a predetermine rule, storing each divided part as a task, and recommending associated information according to information of a task matching user's current situation.

SUMMARY OF THE INVENTION

The aforementioned conventional technologies are realized, for extracting a partial sequence necessary for analyzing the search history, by (1) a method of extracting a partial sequence being referred to by many users, (2) a method of extracting the search history based on similarities of keywords used for searching, and (3) a method of extracting the search history based on URL similarities. However, whether or not a web page reached by each user has included useful information for the user cannot be taken into consideration.

This invention provides a technology of extracting a procedure for reaching useful information by specifying that a user reaches the useful information, and leading the user toward the useful information.

The representative aspects of this invention are as follows. That is, there is provided a computer system, including a computer which is coupled to a server for providing requested information, and which collects the requested information, wherein the computer is configured to: obtain status histories including a history of an operation to a screen which shows a status of the computer, and which is displayed on the computer; record the obtained status histories in chronological order to constitute a set of the status histories; and divide, in a case where a history of an operation of switching the screen is detected from the set of the status histories, the set of the status histories based on the history of the operation of switching the screen.

According to the exemplary embodiment of this invention, whether or not a user has reached target information is judged by detecting a switching operation of a screen displayed on the computer, and hence a history (log) of a procedure carried out to reach the target information can be specified.

BRIEF DESCRIPTION OF THE DRAWINGS

The present invention can be appreciated by the description which follows in conjunction with the following figures, wherein:

FIG. 4A is a diagram illustrating a status log according to the first embodiment of this invention;

FIG. 4B is a diagram illustrating a status log according to the first embodiment of this invention;

FIG. 6A is a diagram illustrating an example of a data structure of a combined log according to the first embodiment of this invention;

FIG. 6B is a diagram illustrating an example of a combined log sequence according to the first embodiment of this invention;

FIG. 7A is a diagram illustrating an example of a data structure of a information collection work log sequence according to the first embodiment of this invention;

FIG. 7B is a diagram illustrating an example of the information collection work log sequence according to the first embodiment of this invention;

FIG. 12A is a diagram illustrating examples of results of the integration processing according to the first embodiment of this invention;

FIG. 12B is a diagram illustrating examples of results of the integration processing according to the first embodiment of this invention;

DETAILED DESCRIPTION OF THE PREFERRED EMBODIMENTS

Figure 1:
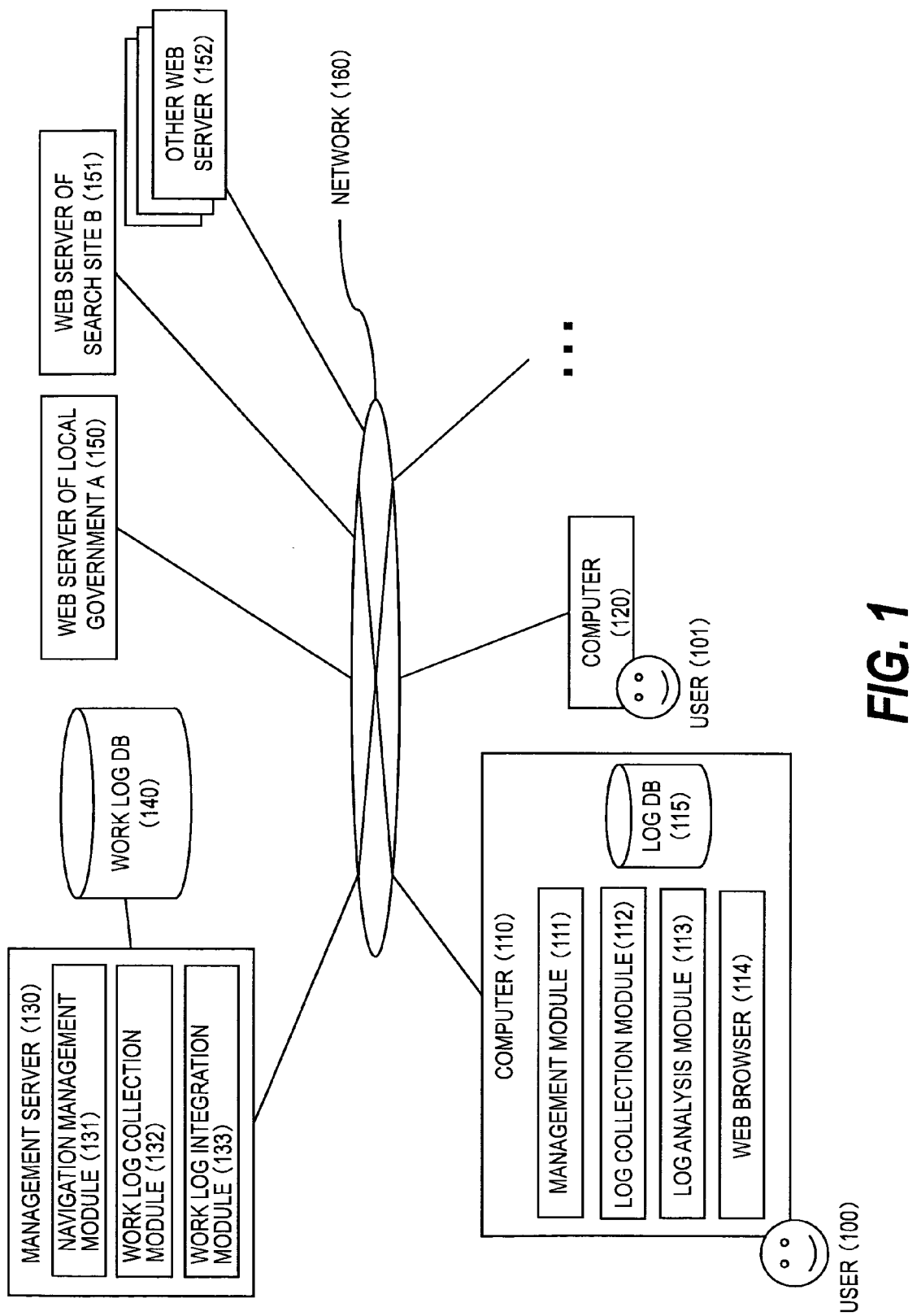
FIG. 1 is a block diagram of a computer system according to a first embodiment of this invention.

Referring to the drawings, preferred embodiments of this invention are described below.

First Embodiment

FIG. 1 is a block diagram of a computer system according to a first embodiment of this invention.

The computer system illustrated in FIG. 1 collects and analyzes logs recorded in a case where many users collect pieces of information. Specifically, the computer system carries out first processing for collecting log sequences from starting of information collection to reaching to target information, and second processing for presenting navigation information during the information collection and reflecting whether a user has utilized a navigation function in the navigation information. The log sequence is a group of serial logs including at least one log.

In the first processing, a log sequence from a start to an end of information collection, in other words, a log sequence which has reached target information, is extracted. Importance is calculated according to a work situation, and an information collection work log sequence that is a log sequence from the start to the end of information collection is generated. The information collection work log sequence is transmitted to a management server.

In the second processing, when the user carries out information collection, navigation information is presented according to a situation of the information collection, and whether the user has utilized navigation is added to update importance of an information collection work log.

In the second processing, by updating not only importance of an information collection work log referred to by many users but also importance of an information collection work log judged to have reached target information, information to be reached only by quite a few knowledgeable and experienced users is fetched. Thus, a problem that important information to be reached only by quite a few knowledgeable and experienced users is buried can be solved.

A status log is a set of a character string and numerical value data indicating a status of the computer at a certain moment. Status logs arrayed in specific order constitute a status log sequence. An information collection work log sequence is a type of a status log sequence. A first status log of the information collection work log sequence indicates a start of information collection, while a last status log indicates an end of the information collection. Referring to FIGS. 4A and 4B and FIGS. 7A and 7B, examples of a status log and an information collection work log sequence are described below in detail.

The computer system according to the first embodiment of this invention includes a computer 110, a management server 130, a work log DB 140, and web servers 150 to 152. The computer system includes other computers such as a computer 120 in addition to the computer 110, and the number of computers is optional. The number of web servers is similarly optional.

The computer 110, the management server 130, the work log DB 140, and the web servers 150 to 152 are interconnected via a network 160.

The computer 110 is used in a case where a user 100 collects pieces of information. A status log of the computer 110 is analyzed, and an information collection work log sequence generated as a result of the analysis is transmitted.

A general PC is assumed for the computer 110. The computer 110 includes a processor, a memory, and an interface. The processor processes programs stored in the memory to carry out various processing. The memory stores programs and data for executing processing. The interface is coupled to the management server 130, the web server 150, and the like via the network 160. The same applies to the other computers such as the computer 120.

The management server 130 receives an information collection work log sequence from each computer via the network 160. The management server 130 generates navigation information to transmit the generated navigation information to each computer. As in the case of the computer 110, the management server 130 includes a processor, a memory, and an interface. The processor processes programs stored in the memory to carry out various processing. The memory stores programs and data for executing processing. The interface is coupled to the work log DB 140 or to the management server 130, the web server 150, and the like via the network 160.

The work log DB 140 stores an analysis result transmitted from each computer. The work log DB 140 may be configured to be included in the management server 130 or to be stored in an external storage device to be coupled to the management server 130. The web servers 150 to 152 supply requested information via the network 160.

The computer 110 includes a management module 111, a log collection module 112, a log analysis module 113, a web browser 114, and a log DB 115. The management module 111, the log collection module 112, the log analysis module 113, and the web browser 114 are, for example, programs stored in the memory to be executed by the processor.

The management module 111 manages the log collection module 112, the log analysis module 113, the web browser 114, and the log DB 115. The management module 111 includes an OS.

The log collection module 112 obtains a status log of the computer 110 at a predetermined timing to execute log collection processing in which the obtained status log is stored in the log DB 115.

The log analysis module 113 analyzes status logs collected by the log collection module 112. Specifically, associated status logs are combined together to generate at least one combined log, and an information collection work log sequence is generated from a combined log sequence. The generated information collection work log sequence is transmitted to the management server 130.

The web browser 114 receives web contents from the web servers 150 to 152 to display the received web contents. The web browser 114 receives navigation contents from the management server 130 to display the received navigation contents. The log DB 115 stores logs collected by the log collection module 112. Further, an information collection work log sequence generated as a result of analysis by the log analysis module 113 is stored in the log DB 115.

The management server 130 includes a navigation management module 131, a work log collection module 132, and a work log integration module 133. The navigation management module 131, the work log collection module 132, and the work log integration module 133 are, for example, programs, and processed by the processor of the management server 130 to be executed.

In order to generate navigation contents, the navigation management module 131 requests the work log integration module 133 to integrate information collection work log sequences, and transmits the generated navigation contents to the web browser 114 of the computer 110.

The work log collection module 132 stores, in the work log DB 140, an information collection work log sequence transmitted from each computer in log analysis processing.

Figure 11:
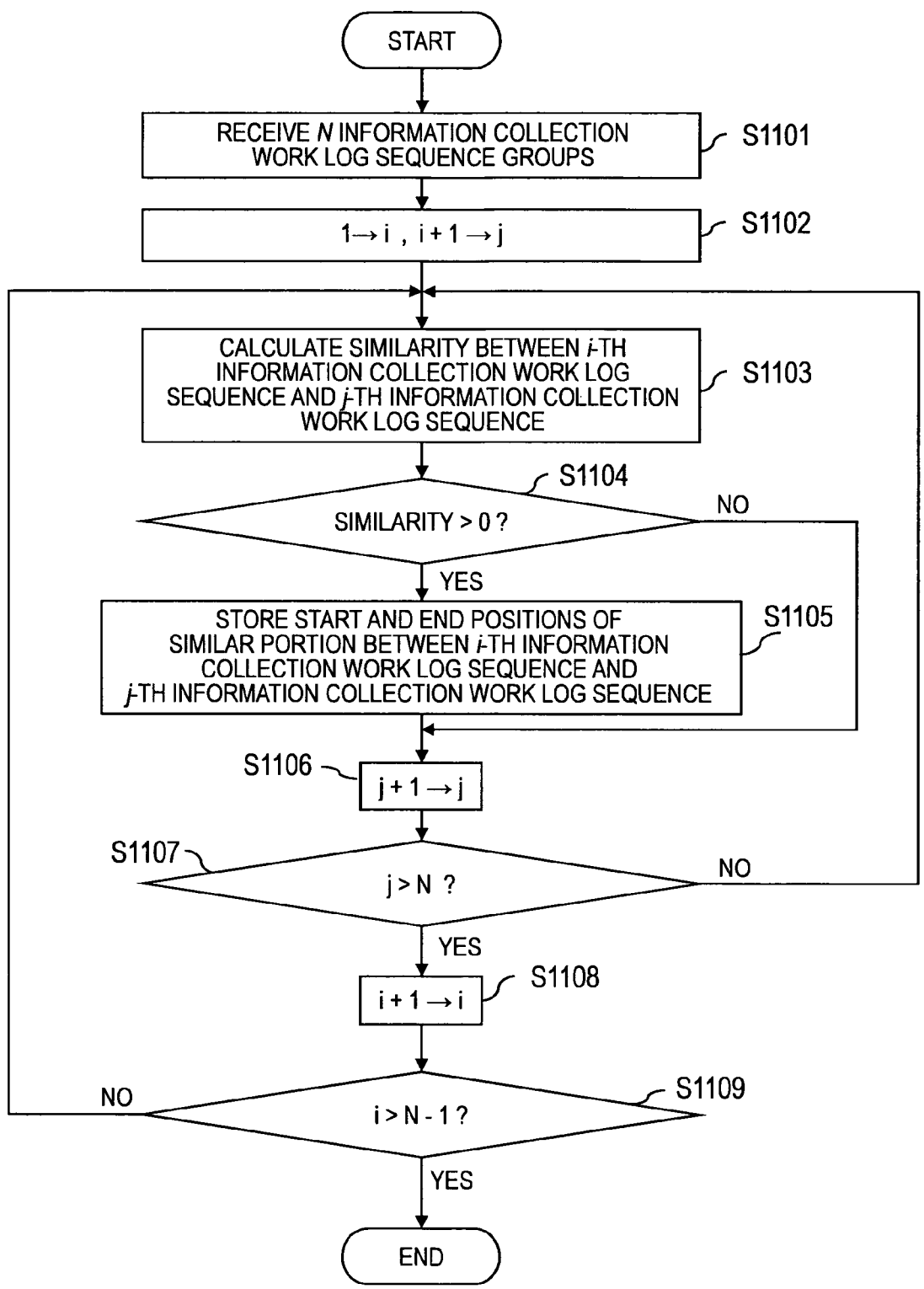
FIG. 11 is a flowchart illustrating an example of a procedure of an integration processing according to the first embodiment of this invention.

The work log integration module 133 receives the request from the navigation management module 131, and obtains information collection work log sequences from the work log DB 140 to integrate the obtained information collection work log sequences. Then, the work log integration module 133 returns the integrated information collection work log sequence to the navigation management module 131. Referring to FIG. 11, the processing of integrating the information collection work log sequences is described below in detail.

An information collection work log sequence transmitted from each computer in the log analysis processing is stored in the work log DB 140 by the work log collection module 132.

The web servers 150 to 152 store web contents including various pieces of information, and supply the web contents in response to a request from the user.

Next, a specific example of processing of the first embodiment of this invention is described. As a specific example, a case where the user 100 collects pieces of information regarding an administrative procedure (moving, childbirth or the like) of a local government A by using the computer 110 is assumed.

Figure 2:
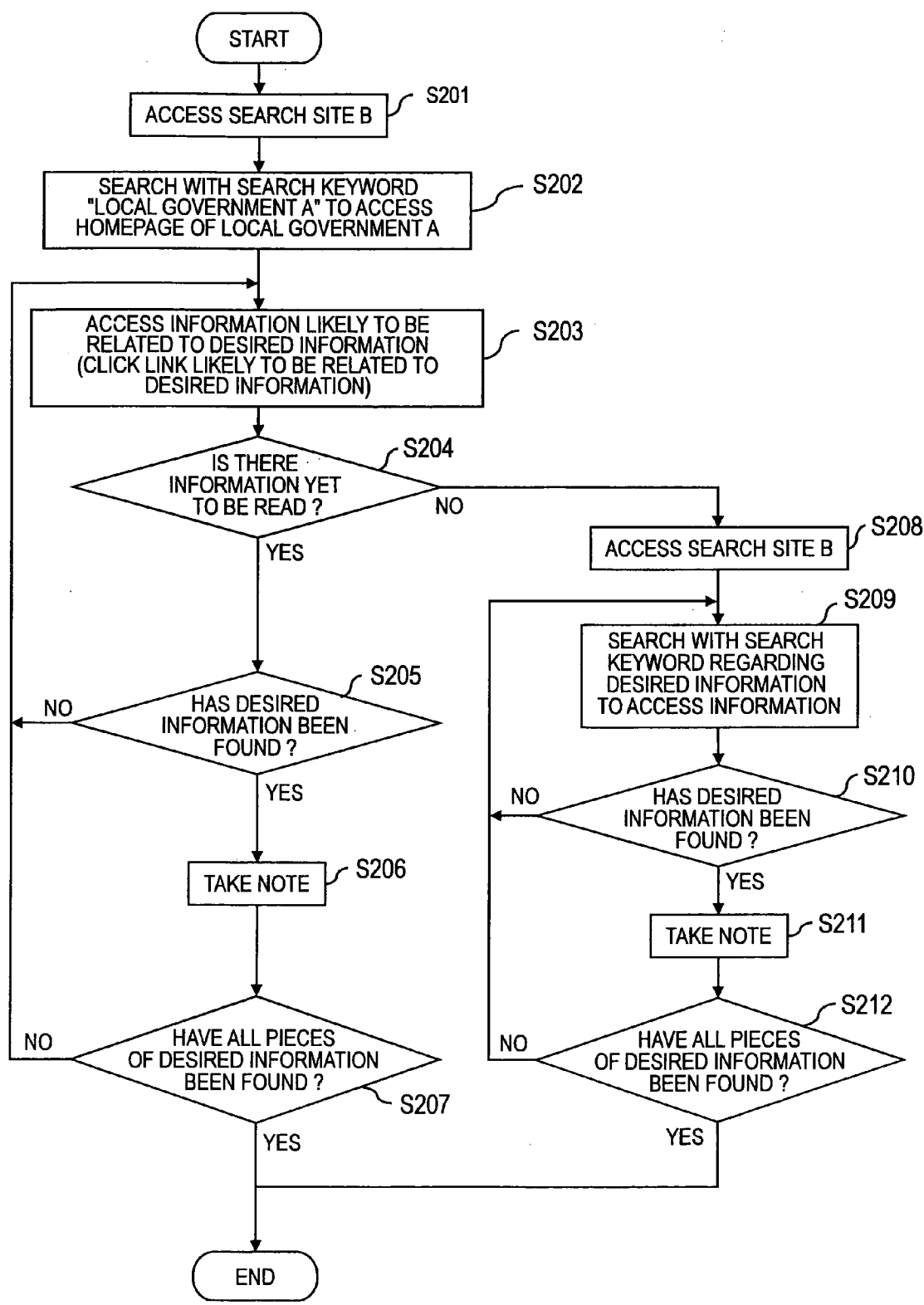
FIG. 2 is a flowchart illustrating an example of an information collection work procedure according to the first embodiment of this invention.

FIG. 2 is a flowchart illustrating an example of an information collection work procedure according to the first embodiment of this invention.

The user 100 first accesses the web server 151 of a search site B ($S_{201}$) to search for a homepage of the local government A ($S_{202}$). The user 100 accesses the web server 150 of the local government A to retrieve information likely to be related with information of a desired administrative procedure ($S_{203}$ and $S_{204}$). Specifically, the user 100 operates a link likely to be related with information of a desired administrative procedure displayed on the homepage of the local government A to refer to contents of a displayed web page.

If desired information has been found (result of Step S205 is "YES"), the user 100 records the information by using a text editor (S206). If all pieces of desired information have been found (result of Step S207 is "YES"), the user 100 finishes the information collection work. On the other hand, if desired information is yet to be found (result of Step S207 is "NO"), the user 100 returns to Step S203. If no desired information is found (result of Step S205 is "NO"), returning to Step S203, the user continues the information collection work in the web server 150 of the local government A until there is no more link likely to be related (S205).

If no information has been found in the information collection work, the user 100 accesses the web server 151 of the search site B again (S208), and enters a keyword (e.g., "local government A moving") regarding desired information to execute search processing (S209). The user 100 accesses a web server to closely check whether information in the web server is necessary information or not (S210). If desired information is found (result of Step S210 is "YES"), the user 100 records the information by using a text editor (S211). If all pieces of information have been found (result of Step S212 is "YES"), the user 100 finishes the information collection work. If desired information is yet to be found (result of Step S212 is "NO"), the user 100 returns to Step S209. If no desired information is found, the user 100 changes the search keyword to repeat Steps S209 to S212 until desired information is found.

It should be noted that, in the information collection work procedure illustrated in FIG. 2, Steps S208 to S212 may be carried out first depending on knowledge or experience of the user 100.

In the above-mentioned information collection work, the user 100 has no idea as to location of desired information. Thus, first, the user 100 tries information collection by using knowledge, specifically, knowledge that the local government A has a homepage and information may be obtained by referring to the homepage. However, if there is no information desired by the user 100 in the web server 150 of the local government A, or if discovery of desired information is difficult because of a link structure or a homepage configuration, the user 100 cannot obtain desired information. Thus, the user 100 tries to collect pieces of desired information by using the search site B. Also in this case, the user 100 cannot obtain any desired information unless the user 100 can select an appropriate search keyword.

In order to solve the problem as described above, according to this invention, web access logs such as those of Steps S201 to S203, S208, and S209 during user's serial information collection work as illustrated in FIG. 2 are collected. Further, status logs of the computer, which includes work logs other than web accesses, such as S206 and S211, are collected. Especially, work logs collected to extract a relationship indicating information discovery, such as Steps S205 and S206 and Steps S210 and S211, are analyzed to generate an information collection work log sequence. Then, while the user 100 is engaged in information collection work, information collection work log sequences of many users including the user 100 are integrated according to a situation of user's information collection to present navigation information.

Presenting the navigation information in the above-mentioned procedure enables fetching of logs at the time of information discovery during information collection work of many users including the user 100. Using the logs at the time of information discovery enables sure collection of pieces of desired information within a short period of time even when the user 100 lacks knowledge or experience of selecting an appropriate keyword.

Next, a processing procedure of the first embodiment of this invention is described. Processing of the first embodiment of this invention is largely divided into two. In the first processing, status logs of the computer during user's serial information collection work are collected and analyzed to generate an information collection work log sequence, and the information collection work log sequence is transmitted to the management server 130. In the second processing, while the user collects pieces of information, the management server 130 integrates information collection work log sequences to present navigation information in real time according to a situation of information collection.

The first processing includes, as described above, the log collection processing and the log analysis processing. First, referring to FIGS. 3 and 4A and 4B, the log collection processing is described.

Figure 3:
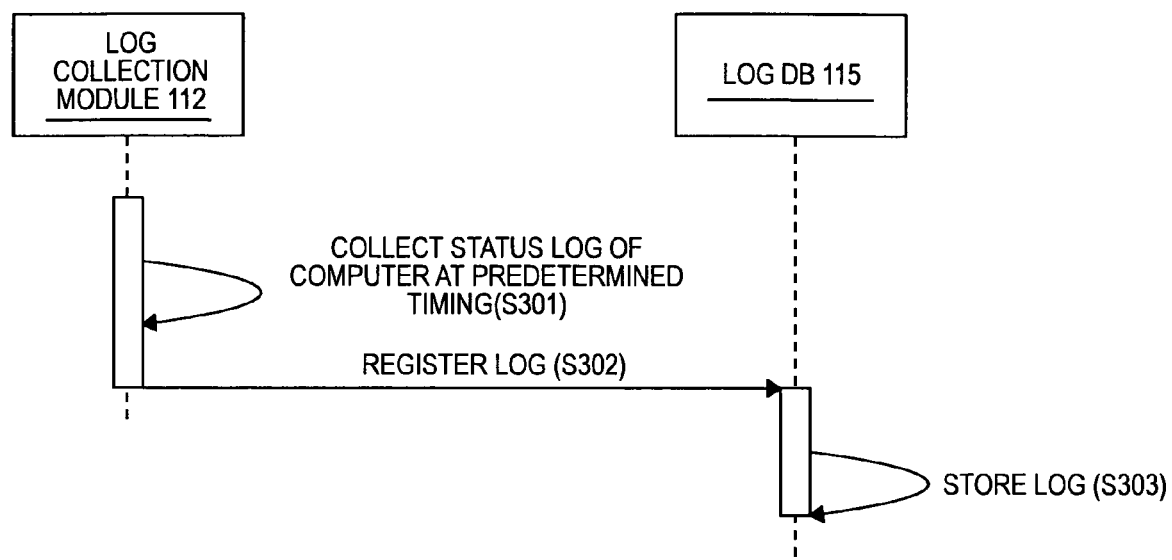
FIG. 3 is a sequential diagram illustrating an example of a procedure of a log collection processing according to the first embodiment of this invention.

FIG. 3 is a sequential diagram illustrating an example of a procedure of the log collection processing according to the first embodiment of this invention.

The log collection processing is processing of collecting status logs of the computer. In the log collection processing, a status log is obtained at a predetermined timing (e.g., one per second) (S301) to be registered in the log DB 115 (S302 and S303).

The status log of the computer records information on applications being browsed and a status of a keyboard or a mouse. FIGS. 4A and 4B illustrate specific examples of status logs.

FIG. 4A is a diagram illustrating a status log according to the first embodiment of this invention, which includes examples of data items.

The status log of the computer illustrated in FIG. 4A includes a date and time, a title of a window (screen), a window class, a URL, a status of a mouse, and a status of a keyboard. All windows being viewed and worked on are targets, and hence all windows including a web browser are targets.

The date and time indicates a date and time of collecting status logs. The title of the window indicates a title of window being viewed or worked on. The window class indicates a type of window. The window class corresponds to an application being executed, for example, a web browser or a text editor. The URL is a URL of web contents displayed in a case where a target window is a web browser.

The status of the mouse is, for example, a position of the mouse or information of a button. The status of the keyboard is information of an operated key.

FIG. 4B is a diagram illustrating a status log according to the first embodiment of this invention, specifically, an example of a status log sequence.

FIG. 4B illustrates an example of a status log generated based on the data items illustrated in FIG. 4A. The window class records a web browser for browsing a web and a text editor for entering a memo in a case where desired information is found.

The mouse status and the keyboard status may be classified into predetermined patterns to record identifiers of the patterns.

A function for realizing the log collection processing may be resident as software on the computer or mounted as hardware on the computer. Computer statuses collected by the log collection processing vary depending on a type of computer or a type of OS.

In the log analysis processing, a status log sequence collected in the log collection processing is analyzed to extract a status log of a start of information collection and a status log of an end of the information collection, in other words, a status log which has reached target information. An information collection work log sequence that is a status log sequence from a start to an end is generated to be transmitted to the management server.

Figure 5:
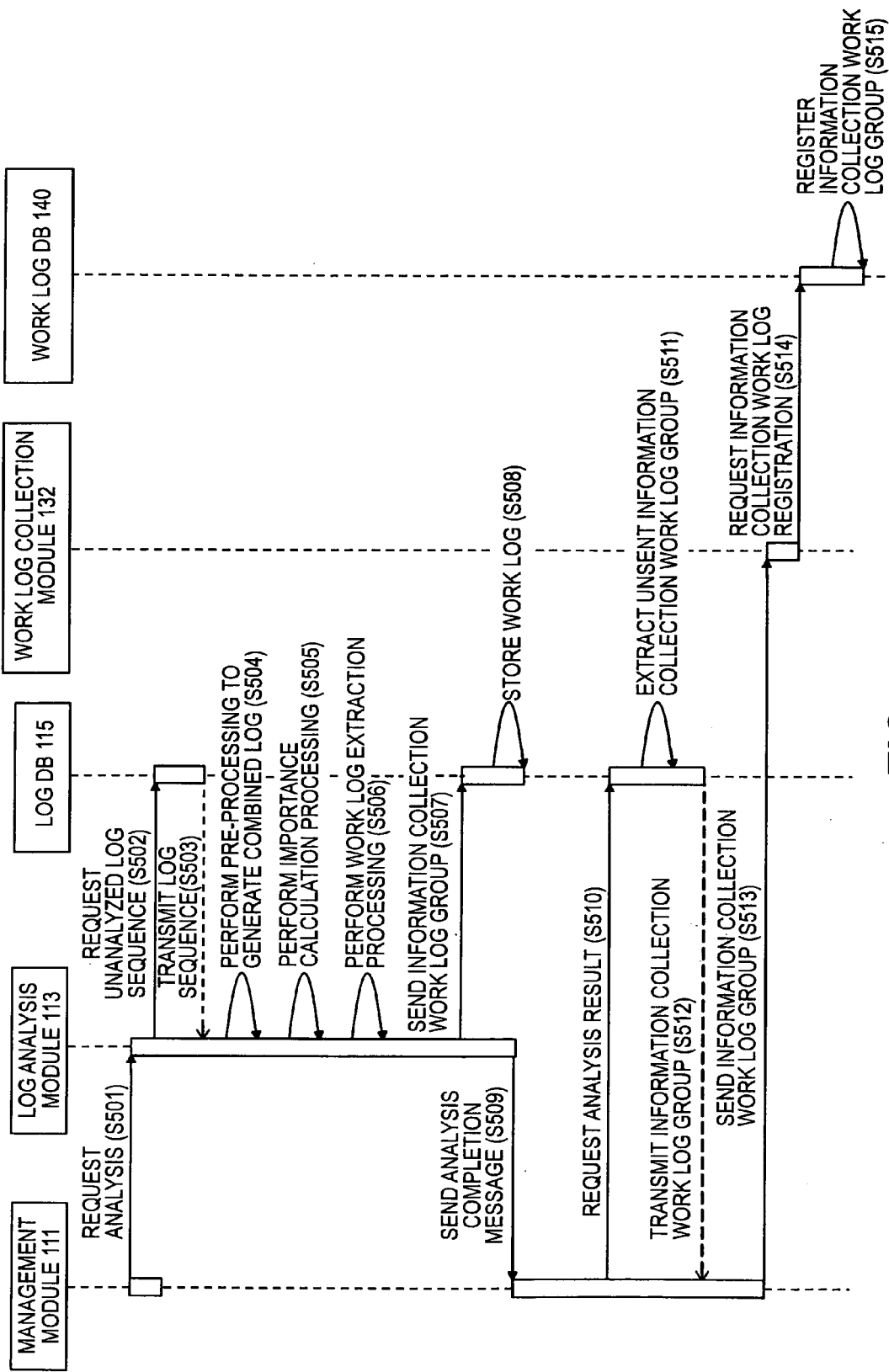
FIG. 5 is a sequential diagram illustrating an example of a procedure of a log analysis processing according to the first embodiment of this invention.

FIG. 5 is a sequential diagram illustrating an example of a procedure of the log analysis processing according to the first embodiment of this invention.

The management module 111 first transmits a log analysis request to the log analysis module 113 (S501). The log analysis module 113 obtains a log yet to be analyzed from the log DB 115 (S502 and S503). Preprocessing is executed to generate a combined log (S504).

The preprocessing is preprocessing of integrating logs in which the same window class or title continues, and removing an unnecessary portion from the integrated log. The unnecessary portion is, for example, a portion not so much associated with information collection, such as a web page displayed at the time of starting the web browser or work carried out daily.

The combined log is generated based on the status log integrated by the preprocessing. For example, in the case of referring to a displayed page while one status log is recorded per second, several identical status logs are recorded if the computer is not operated for several seconds. In this case, the recorded identical status logs are integrated. The status logs are integrated in a case where only mouse positions are different. Specifically, in a case where a screen displayed on the computer 110 is switched, the status logs are formed into different combined logs before/after the switching. The screen switching occurs when an application being operated is switched to another, when switching of a web page being referred to changes a title of the screen, or the like. A data structure of a combined log and a combined log sequence is described below.

FIG. 6A is a diagram illustrating an example of the data structure of the combined log according to the first embodiment of this invention.

The combined log of the computer illustrated in FIG. 6A includes a start date and time, an end date and time, a window title, a URL, a window class, a mouse changing amount, and a keyboard changing amount. The start date and time indicates a date and time of a log recorded earliest among combined status logs. On the other hand, the end date and time indicates a date and time of a log recorded last among the combined status logs. The window title, the URL, and the window class are similar to those of the status logs illustrated in FIGS. 4A and 4B. For the mouse changing amount, a mouse moving distance or the like is recorded. For the keyboard changing amount, an entered character string or the like is recorded.

FIG. 6B is a diagram illustrating an example of the combined log sequence according to the first embodiment of this invention. As compared with the status log of FIG. 4B, in the combined log, a plurality of status logs are basically integrated for each user's work.

The status log of the computer 110 is divided at, for example, a timing at which an application operated by the user is switched from the web browser 114 to the text editor. Accordingly, a combined log corresponding to work in the web browser 114 and a combined log corresponding to work in the text editor are generated.

Description is now returned to the sequential diagram of FIG. 5.

Figure 8:
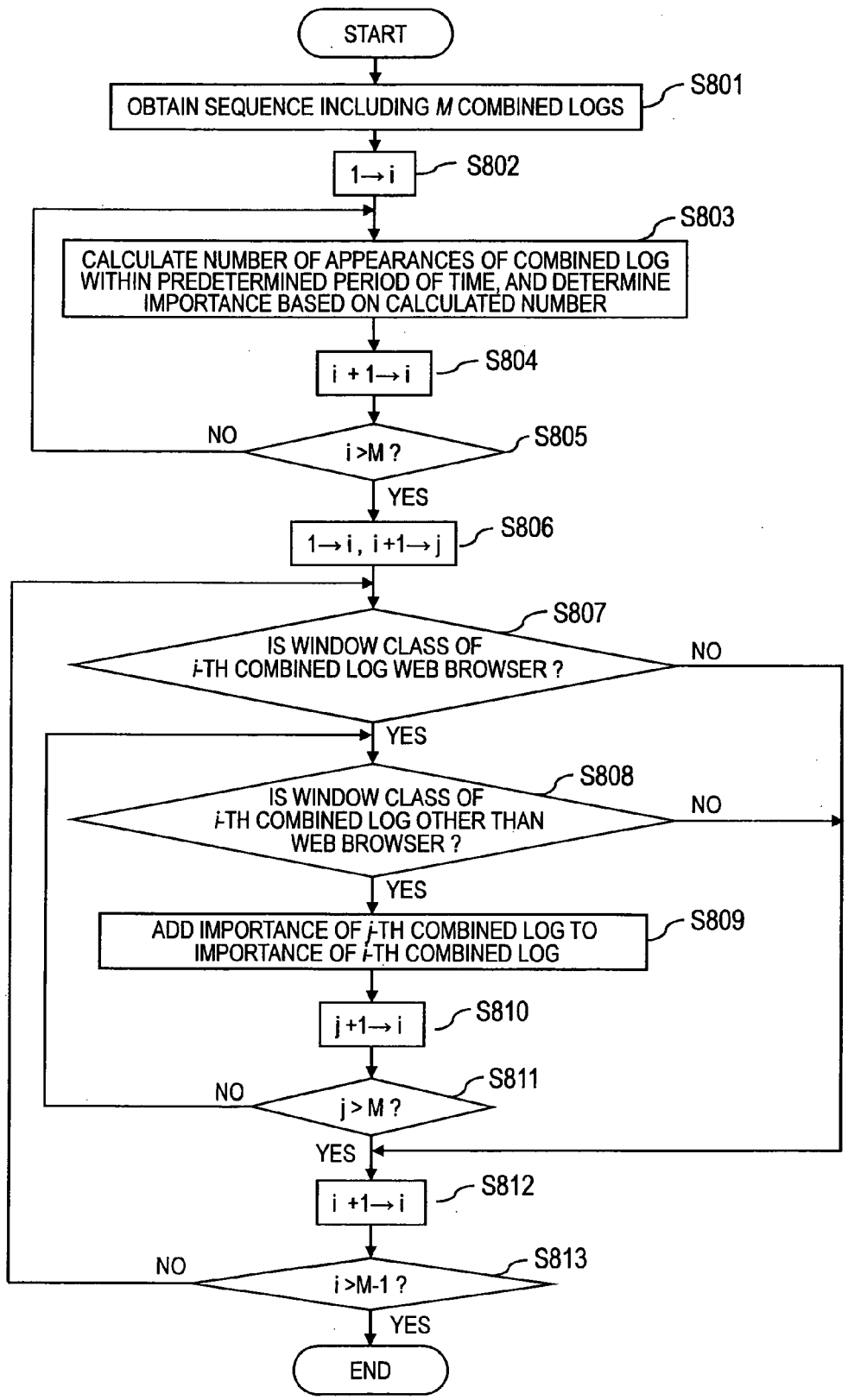
FIG. 8 is a flowchart illustrating a procedure of an importance calculation processing according to the first embodiment of this invention.

The log analysis module 113 then executes importance calculation processing on each combined log (S505). In the importance calculation processing, importance is added to each combined log based on an appearance frequency of the combined log of the same type within a specific period of time and importance of consecutive combined logs in a combined log sequence. Referring to FIG. 8, the importance calculation processing is described below in detail.

The log analysis module 113 executes work log extraction processing to extract an information collection work log sequence (S506). The log analysis module 113 registers the extracted information collection work log sequence in the log DB 115 (S507 and S508) to transmit an analysis completion message to the management module 111 (S509).

Figure 9:
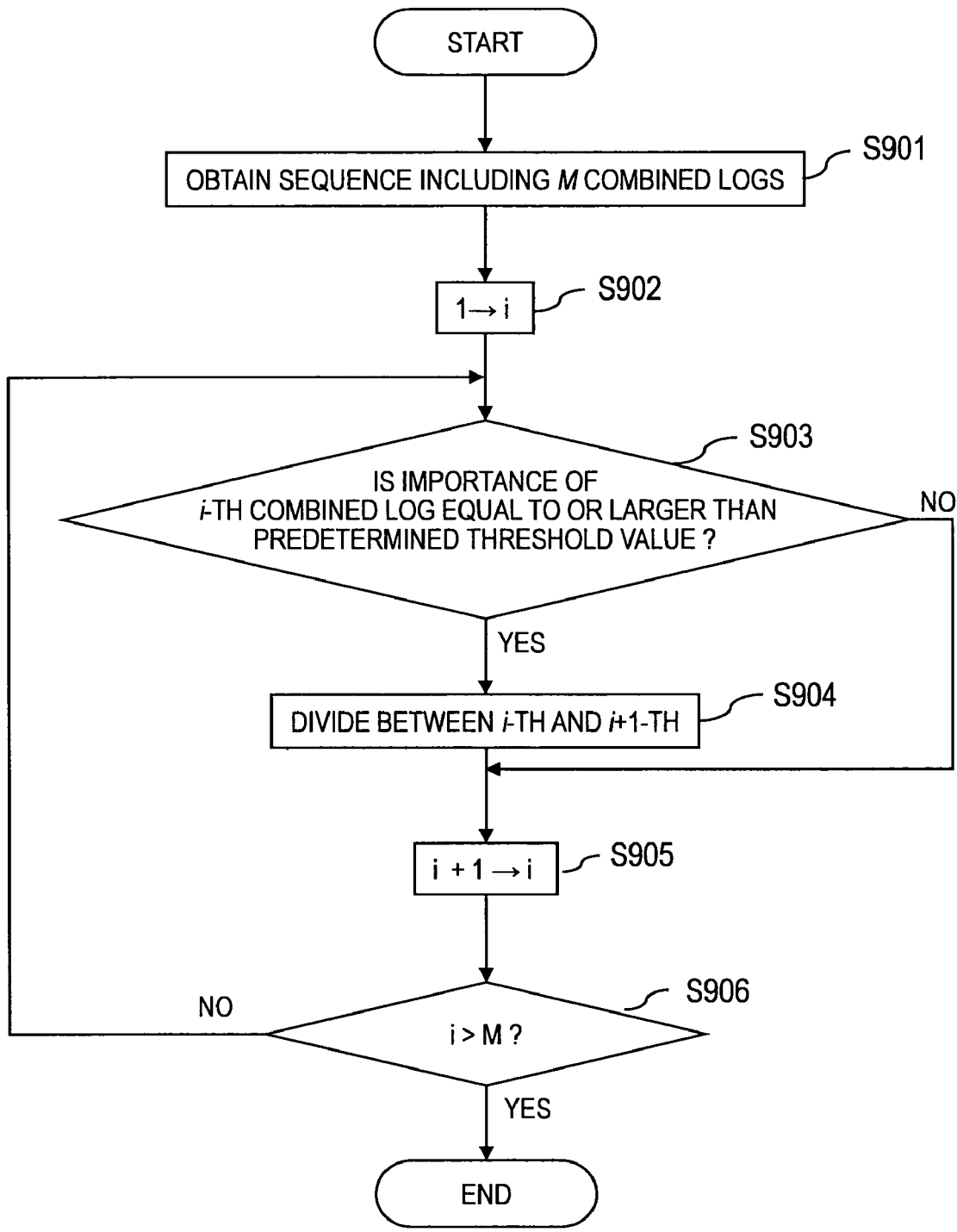
FIG. 9 is a flowchart illustrating an example of a procedure of a work log extraction processing according to the first embodiment of this invention.

In the work log extraction processing, as a result of the log analysis processing, a serial information collection procedure to reach target information by the user is extracted as one information collection work log. The information collection work log corresponds to the combined log. Referring to FIGS. 7A and 7B, the information collection work log is described below in detail. Referring to FIG. 9, the work log extraction processing is described below in detail.

The management module 111 that has received the analysis completion message obtains an untransmitted information collection work log sequence group from the log DB 115 (S510 to S512) to transmit the obtained information collection work log sequence group to the work log collection module 132 of the management server 130 (S513). The work log collection module 132 that has received the information collection work log sequence group registers the information collection work log sequence group in the work log DB 140 (S514 and S515).

FIG. 7A is a diagram illustrating an example of a data structure of the information collection work log sequence according to the first embodiment of this invention.

The information collection work log sequence is a set of associated information collection work logs. For example, in a case where information is retrieved by referring to the web browser and a memo is entered to the text editor, an information collection work log in the web browser and an information collection work log in the text editor are integrated.

The information collection work log sequence includes a window title column, a URL column, a window class column, importance, and an importance column.

A window title, a URL, and a window class of each integrated information collection work log are respectively recorded in the window title column, the URL column, and the window class column. In the importance column, importance of each information collection work log is recorded. In the importance, importance of the entire information collection work log sequence is recorded.

FIG. 7B is a diagram illustrating an example of the information collection work log sequence according to the first embodiment of this invention.

The information collection work log sequence (#1) of FIG. 7B includes an information collection work log 1 for collecting pieces of information by the web browser, and an information collection work log 2 for recording the collected pieces of information by the text editor.

FIG. 8 is a flowchart illustrating a procedure of the importance calculation processing according to the first embodiment of this invention.

First, the log analysis module 113 obtains a combined log sequence including M combined logs generated by the pre-processing (S504 of FIG. 5) (S801). The log analysis module 113 calculates the number of appearances of combined logs identical in window title, URL and window class within a predetermined period of time, and determines importance of each combined log based on the calculated number (S802 to S805). Various relationships are conceivable between importance and the number of appearances, such as judgment that a URL frequently referred to to collect pieces of specific information is important. A specific case is when only the number of appearances is set as importance, or when appearance time is added to the number of appearances.

Then, the analysis module 113 adds importance of consecutive combined logs in the combined log sequence. In this case, whether to add importance of consecutive combined logs is determined based on whether the web browser is used. In other words, if a window class of an i-th ($0<i<M$) combined log is a web browser while a window class of an i+j-th ($1<j$) combined log is not a web browser, importance of the i-th combined log is increased based on importance of the i+j-th combined log (S806 to S813). A method involving increasing importance may be addition or multiplication. According to this invention, importance is continuously increased until the window class of the i+j-th combined log becomes a web browser.

More specifically, importance of a combined log corresponding to subsequently executed processing is added to a combined log in which a window class is a web browser 114 (S809). If processing is switched to another application after the web browser 114 is operated (result of Step S808 is "YES"), importance is increased judging a high possibility that the processing has been switched to another application to record collected pieces of information. In the information collection work log sequence (#1) of FIG. 7B, importance w1 of the information collection work log 1 is a value obtained by adding importance w2 of the information collection work log 2 to importance determined based on an appearance frequency. Thus, setting is carried out so that importance of a combined log corresponding to a case where target information is reached by the web browser 114 is increased.

In the information collection work log sequence (#1) of FIG. 7B, it is presumed that pieces of target information are collected by the web browser 114 (information collection work log 1) and a memo is entered to the text editor based on the collected pieces of information (information collection work log 2). In other words, it is judged that pieces of target information have been collected in a case where a recording application such as the text editor is operated after an operation of collecting pieces of information by the web browser 114. Whether pieces of target information have been collected or not may be judged by detecting storage or printing of a web page. For detection of status history corresponding to storage or printing of the web page may be detection of displaying of a screen for entering a file name or a screen for selecting a printer, or detection of execution of storage processing or printing processing.

The calculation of importance of a combined log as described above enables extraction of a relationship indicating information discoveries of Steps S205 and 206 and Steps S210 and S211 of FIG. 2, which is a feature in a case where the user collects pieces of information, and reflection of the relationship in importance of a corresponding combined log.

FIG. 9 is a flowchart illustrating an example of a procedure of the work log extraction processing according to the first embodiment of this invention.

The log analysis module 113 first obtains a combined log sequence including M combined logs in which importance calculation processing has been finished (S901). The log analysis module 113 judges whether or not importance of an i-th ($1<i<M-1$) combined log exceeds a predetermined threshold value (S903). In a case where the importance exceeds the threshold value (result of S903 is "YES"), the log analysis module 113 divides the combined log sequence between the i-th combined log and an i+1-th combined log (S904). In the processing of FIG. 8, setting is executed so that the importance of the corresponding combined log can be large in a case where a possibility is high that the target information has been reached by using the web browser 114. Thus, the combined log sequence is divided in a series of work after the target information has been reached, and the information collection work log sequence corresponds to the divided combined log sequence.

Importance of the information collection work log sequence is determined by a sum total of information collection work logs included in the information collection work logs.

Through the processing described above, the feature when the user carries out information collection work is taken into consideration, and some information collection work log sequence groups can be extracted from the combined log sequence including M combined logs.

Next, the second processing is described below. The second processing includes navigation processing, integration processing, and feedback processing.

The navigation processing is processing of generating navigation contents corresponding to a current-time status of the computer to display the generated navigation contents on the web browser.

Figure 10:
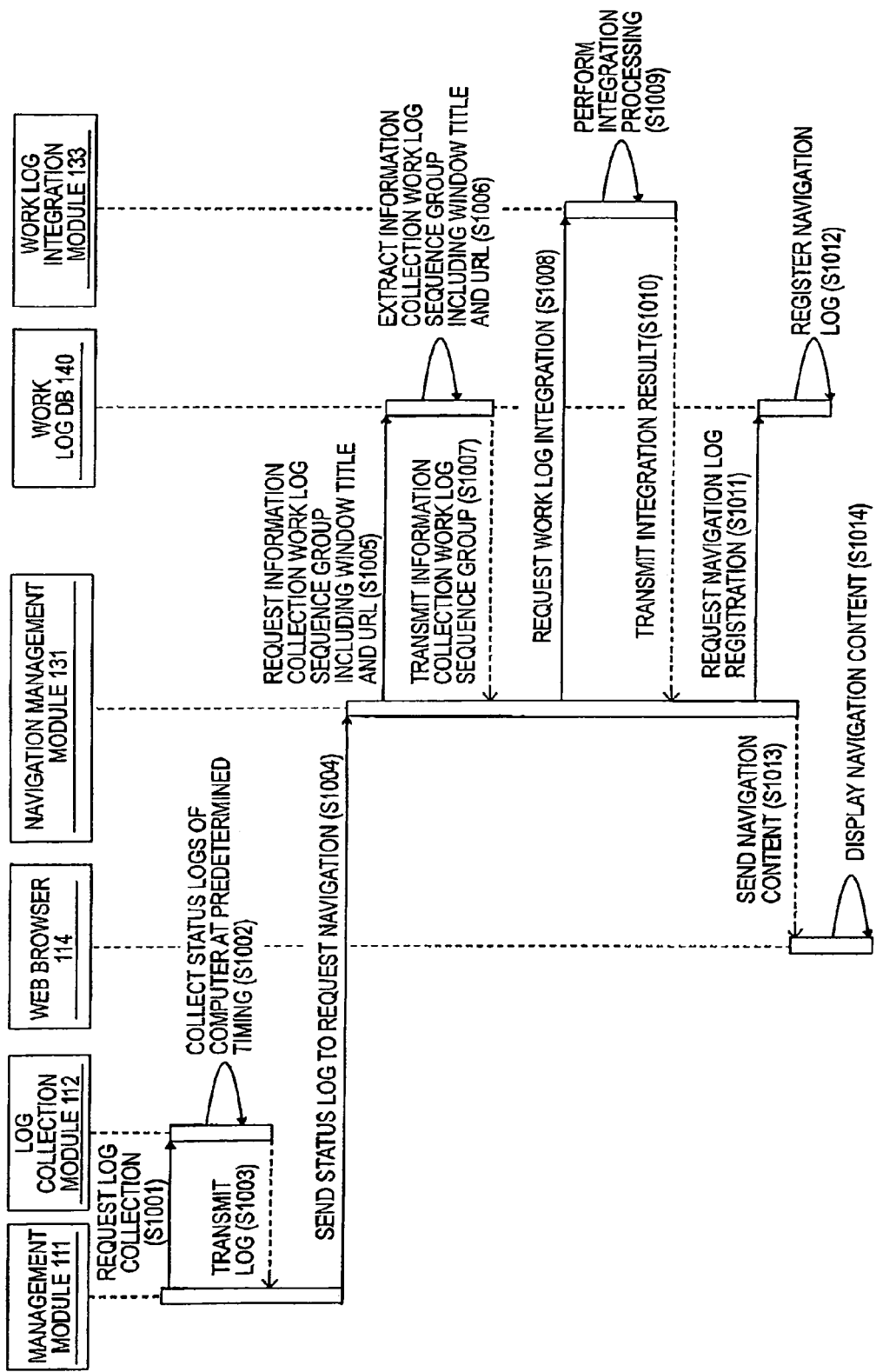
FIG. 10 is a sequential diagram illustrating an example of a procedure of a navigation processing according to the first embodiment of this invention.

FIG. 10 is a sequential diagram illustrating an example of a procedure of the navigation processing according to the first embodiment of this invention.

The management module 111 of the computer 110 first requests the log collection module 112 to collect current status logs (S1001). The log collection module 112 collects status logs of the computer 110 at a predetermined timing (S1002) to transmit the collected status logs to the management module 111 (S1003). The management module 111 transmits the received status logs to the navigation management module 131 of the management server 130 to request a start of navigation (S1004).

Having received the navigation start request, the navigation management module 131 obtains an information collection work log sequence group including a window title and a URL and included in the received status logs from the work log DB 140 (S1005 to S1007). Then, the navigation management module 131 transmits the work log sequence group to the work log integration module 133 (S1008).

The work log integration module 133 integrates work log sequence groups by integration processing (S1009) to transmit the integrated group to the navigation management module 131 (S1010). The integration processing is processing of integrating many user's information collection work log sequence groups including the user 100. Referring to FIG. 11, the integration processing is described below in detail.

The navigation management module 131 stores history of navigation content transmission in the work log DB 140 (S1011 and S1012). The navigation management module 131 transmits the integration result received from the work log integration module 133 as a navigation content to the web browser 114 (S1013). The web browser 114 displays the received navigation content (S1014).

FIG. 11 is a flowchart illustrating an example of a procedure of the integration processing according to the first embodiment of this invention.

The work log integration module 133 first receives N information collection work log sequences from the navigation management module 131 (S1101). The work log integration module 133 then initializes variables i and j (S1102) to calculate a similarity between an i-th (0<i<N−1) information collection work log sequence and a j-th (i<j<N) information collection work log sequence (S1103).

The work log integration module 133 determines whether the similarity is larger than 0 (S1104). In a case where the similarity is larger than 0 (result of S1104 is "YES"), the work log integration module 133 records start and end positions of similar portions of the i-th and j-th information collection work log sequences (S1105).

Definition of the similarity may be, for example, a case where the number of information collection work logs having identical window titles, URLs and window classes included in the two sequences is a reference, or a case where a similarity between character strings included in the window titles is a reference.

The work log integration module 133 calculates similarities for all the information collection work log sequences in the similar manner as described above. FIGS. 12A and 12B illustrate examples of results of integrating information collection work log sequences.

FIGS. 12A and 12B are diagrams illustrating examples of results of the integration processing according to the first embodiment of this invention.

FIG. 12A is a diagram illustrating an integration example in a case where the number of information collection work logs having identical window titles, URLs and window classes included in the two sequences is a reference.

In FIG. 12A, integrating information collection work log sequences A1 and A2 enables acquisition of an information collection work log sequence A3. N1 to N6 denote information collection work logs.

The information collection work log sequences A1 and A2 include information collection work logs N1 and N2 in common. In the information collection work log sequence A1, the information collection work log N2 is disposed immediately after the information collection work log N1. In the information collection work log sequence A2, information collection work logs N5 and N6 are disposed between the information collection work logs N1 and N2.

Thus, in the integrated information collection work log sequence A3, the information collection work log branches into the information work collection log N2 or N5 after the information collection work log N1, and merges with the information collection work log N2.

FIG. 12B is a diagram illustrating an integration example when a similarity between character strings included in window titles is a reference.

In FIG. 12B, integrating information collection work log sequences B1 and B2 enables acquisition of an information collection work log sequence B3.

It is presumed that window titles of the information collection work logs N2 and N8 are similar to each other. In the information collection work log sequence B3, by coupling the similar information collection work logs N2 and N8 together, the information collection work log sequences B1 and B2 are integrated.

Next, feedback processing is described. The feedback processing is executed by the navigation management module 131 to update importance of an information collection work log sequence. The feedback processing includes two types of processing, that is, update processing based on usefulness of navigation and update processing executed in a case where an information collection work log sequence is added to the work log DB 140.

First, the update processing based on usefulness of navigation is described.

Figure 13:
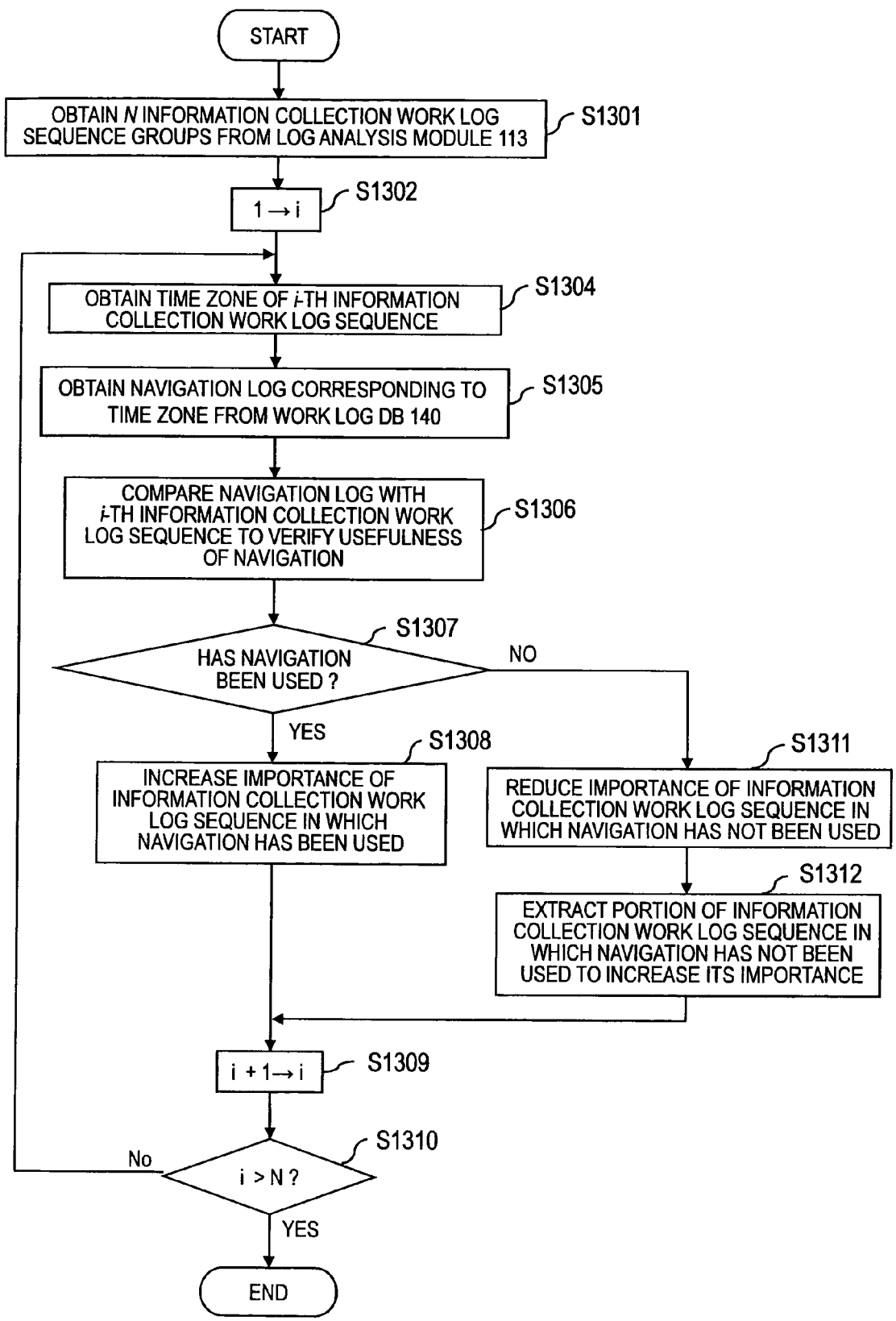
FIG. 13 is a flowchart illustrating a procedure of an update processing based on usefulness of navigation according to the first embodiment of this invention.

FIG. 13 is a flowchart illustrating a procedure of the update processing based on usefulness of navigation according to the first embodiment of this invention.

The navigation management module 131 first receives N information collection work log sequence groups from the log analysis module 113 (S1301). The navigation management module 131 obtains a time zone in which an i-th (0<i<N) information collection work log sequence has been executed (S1304), and obtains a navigation log corresponding to the time zone from the work log DB 140 (S1305).

The navigation management module 131 compares the obtained navigation log with the i-th information collection work log sequence to verify usefulness of navigation (S1306), and to judge whether navigation has been used (S1307).

If the navigation has been used (result of S1307 is "YES"), the navigation management module 131 increases importance of a used information collection work log sequence among information collection work log sequences included in navigation contents (S1308). On the other hand, if no navigation has been used (result of S1307 is "NO"), the navigation management module 131 reduces importance of an unused information collection work log sequence among the information collection work log sequences included in the navigation contents (S1311). The navigation management module 131 extracts an information collection work log sequence executed without using any navigation to increase importance of this portion (S1312).

Next, the update processing executed in a case where an information collection work log sequence is added to the work log DB 140 is described.

Figure 14:
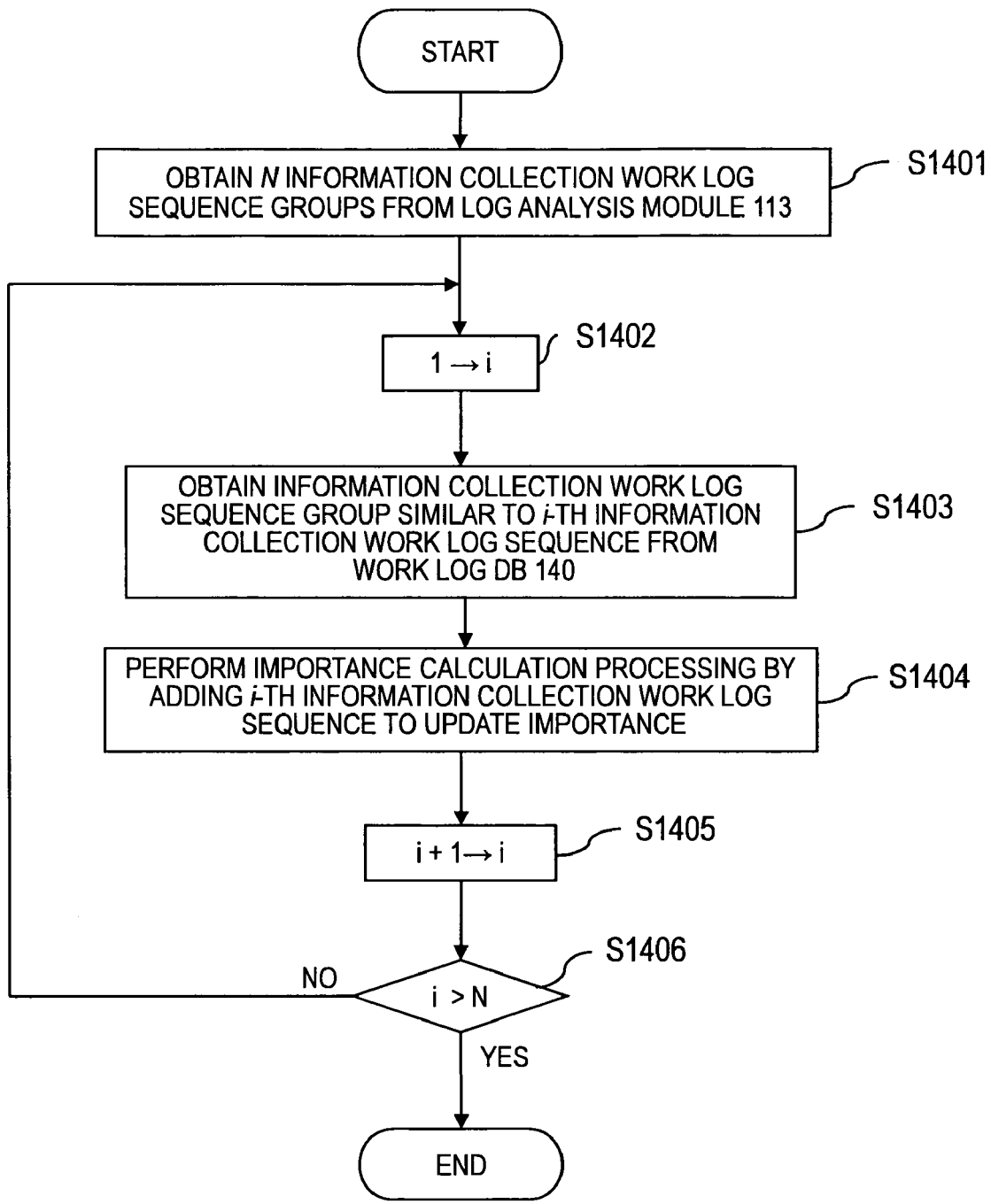
FIG. 14 is a flowchart illustrating a procedure of the update processing executed in a case where an information collection work log sequence is added according to the first embodiment of this invention.

FIG. 14 is a flowchart illustrating a procedure of the update processing executed in a case where an information collection work log sequence is added according to the first embodiment of this invention.

The navigation management module 131 first receives N information collection work log sequence groups from the log analysis module 113 (S1401). The navigation management module 131 extracts an information collection work log sequence group similar to an i-th (0<i<N) information collection work log sequence from the work log DB 140 (S1403).

The navigation management module 131 adds the i-th information collection work log sequence to the extracted information collection work log sequence group, and executes importance calculation processing to update importance of each of the information collection work log sequence group and the i-th information collection work log sequence (S1404).

The update processing described above enables increasing of importance of important information yet to be reached by many users. Importance of an information collection work log sequence can be updated based on a tendency of user's information collection work, and the tendency of user's information collection work can be reflected on navigation.

Figure 15:
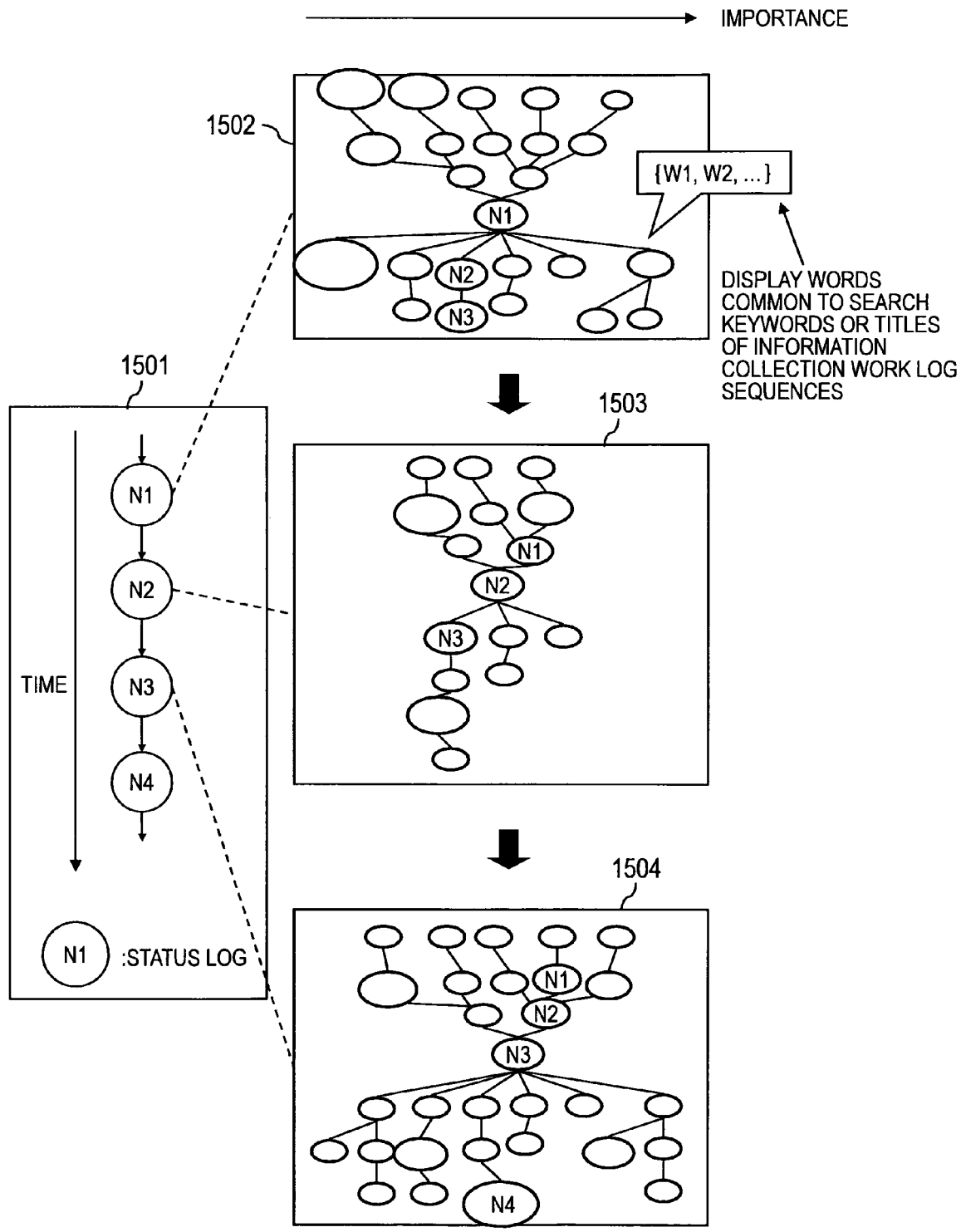
FIG. 15 is a diagram illustrating an example of navigation contents according to the first embodiment of this invention.

FIG. 15 is a diagram illustrating an example of navigation contents according to the first embodiment of this invention.

The left side of FIG. 15 shows a status log 1501 of the computer 110 of the user 100. In the status log 1501, a status changes in order of N1→N2→N3→N4. The status change accompanies sequential displaying of navigation contents 1502, 1503 and 1504 on the web browser 114.

Nodes included in the navigation contents correspond to information collection work logs, especially to those when the web browser is referred to. Each node is linked to a node corresponding to another information collection work log associated with a corresponding information collection work log. Thus, the navigation contents are formed into a tree structure which includes the node corresponding to the information work collection log and an edge for linking with the associated nodes.

The navigation content 1502 is displayed in a case where a page corresponding to the status log N1 is being referred to by the web browser 114. Similarly, the navigation content 1503 corresponds to the status log N2, and the navigation content 1504 corresponds to the status log N3. A URL of a page displayed on the web browser corresponds to a URL included in the information collection work log.

Nodes included in the navigation contents 1502 to 1504 are arrayed based on importance of the information collection work log sequences. In the example of FIG. 15, the nodes are arranged left to right in descending order.

To increase navigation efficiency, information regarding the information collection work log sequence is displayed near the information collection work log of the navigation contents, or selected by the mouse to be displayed as pop-up information. This displayed information may be, for example, a search keyword common to the information collection work log sequences, a word common to titles, or a search keyword or a title of each work log of the information collection work log sequence.

As described above, each node corresponds to an information collection work log. Thus, operating of the node (e.g., selecting by the mouse to double-click) enables a web page corresponding to a URL corresponding to the information collection work log to be displayed in the web browser.

According to the first embodiment of this invention, the first processing for collecting and analyzing status logs from the start of information collection to reaching the target information enables extraction of an information collection work log sequence in which whether or not the user has reached the target information is taken into consideration.

According to the first embodiment of this invention, presenting navigation information which is generated based on the information collection work log sequence extracted in the first processing enables the user to efficiently collect pieces of target information.

According to the first embodiment of this invention, the information collection work log sequence is extracted based on work of many users of the computer system. Thus, navigation information based on a result of many user's information collection work can be presented.

According to the first embodiment of this invention, whether or not the user has used a navigation function can be reflected on the navigation information. Thus, even in the case of important information, by fetching information reachable only by a quite a few users, importance of the information collection work log sequence can be updated to be reflected on the navigation information provided to the user.

Second Embodiment

According to the first embodiment of this invention, the information collection logs collected by the computer are analyzed. According to the second embodiment, however, information collection logs are analyzed by a management server. The second embodiment is described below. Description of contents similar to those of the first embodiment is omitted when appropriate.

Figure 16:
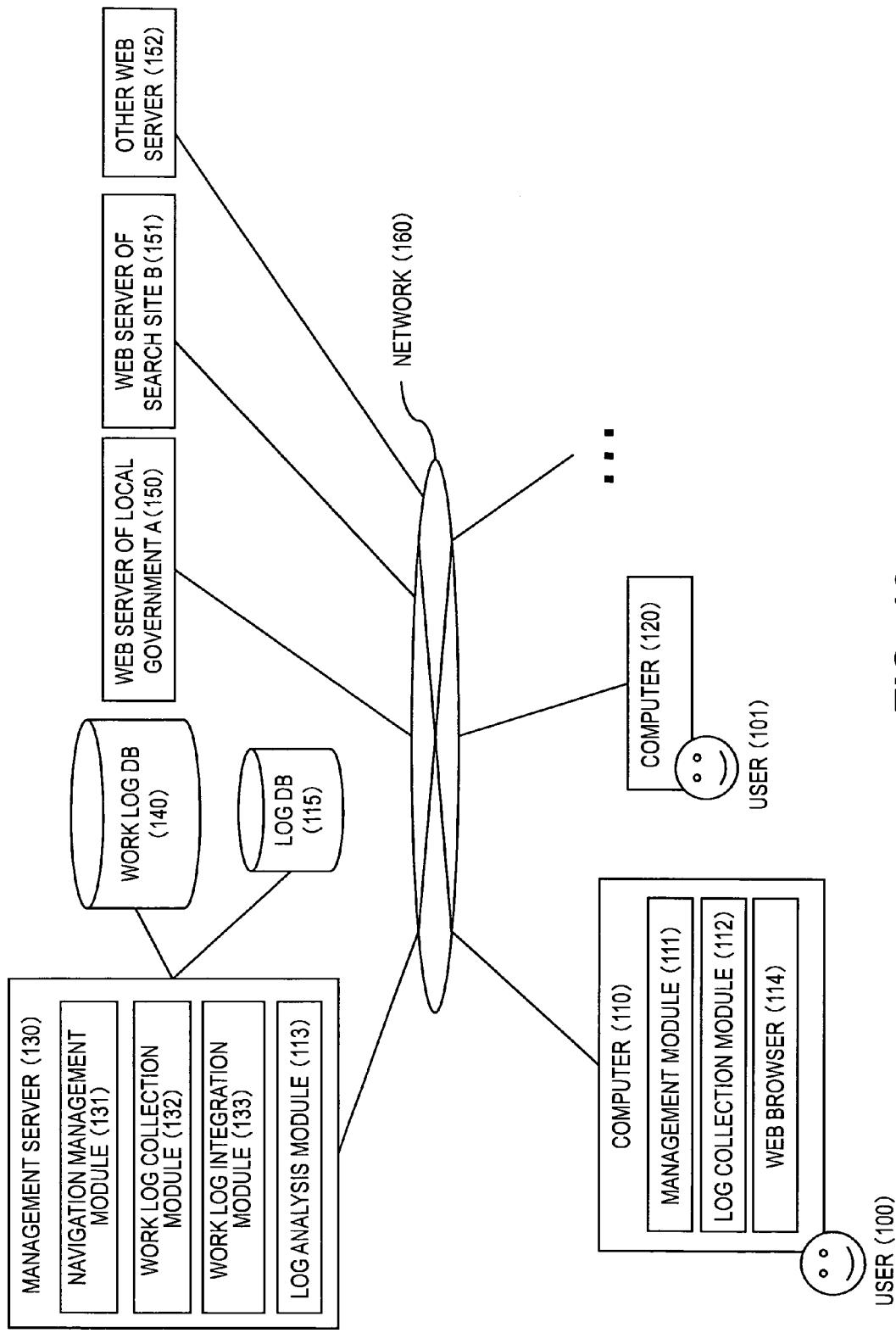
FIG. 16 is a block diagram of a computer system according to a second embodiment of this invention.

FIG. 16 is a block diagram of a computer system according to the second embodiment of this invention.

As described above, according to the first embodiment, the log analysis processing is carried out in the computer 110. However, according to the second embodiment, as illustrated in FIG. 16, a log analysis module 113 is included in the management server 130. Thus, a log DB 115 for storing status logs is also managed by the management server 130. The log DB 115 may be stored in a storage device included in the management server 130 or an external storage device. Other components are similar to those of the first embodiment.

Figure 17:
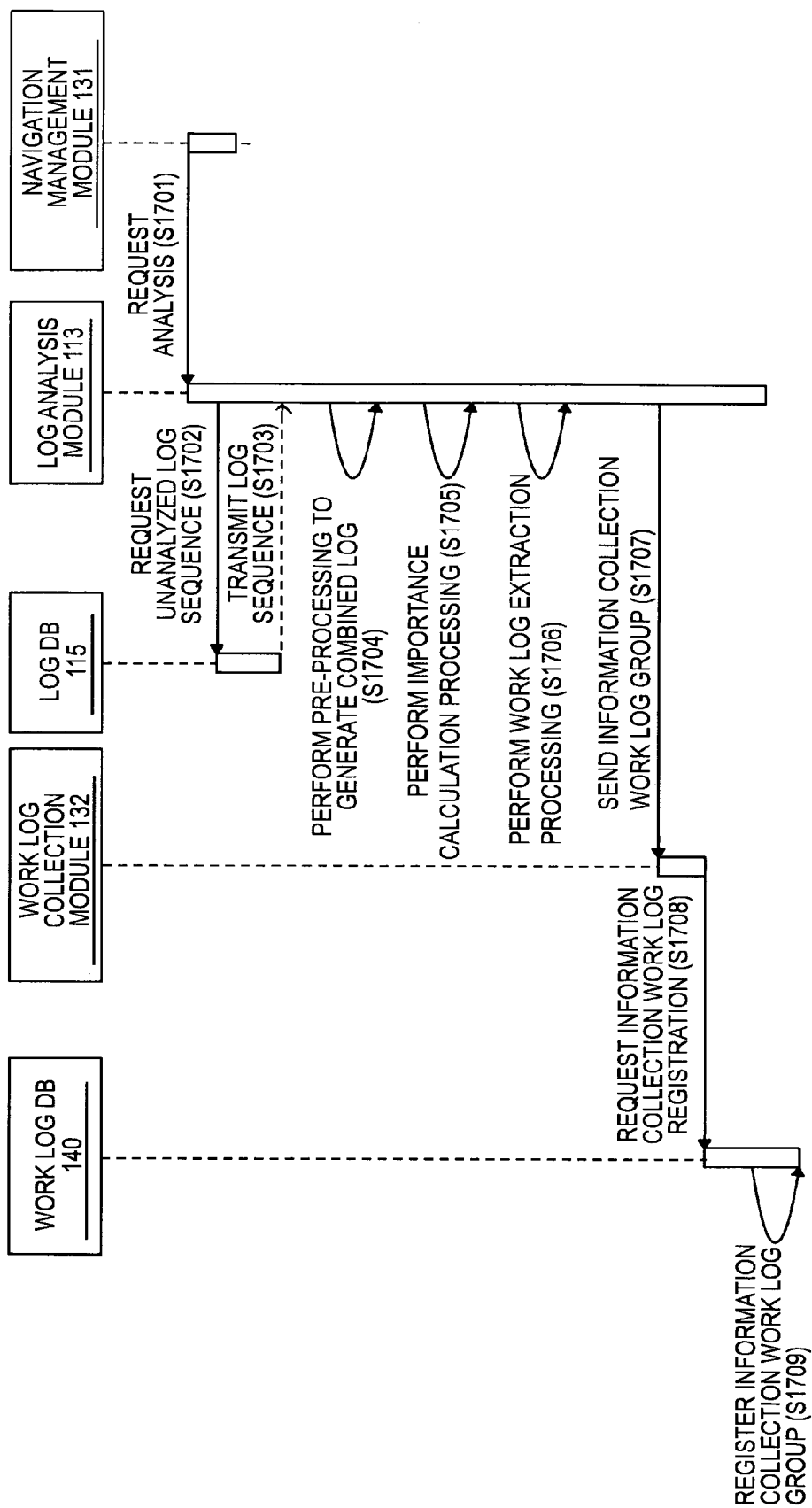
FIG. 17 is a sequential diagram illustrating an example of a log analysis processing procedure according to the second embodiment of this invention.

The second embodiment is different from the first embodiment in procedure of log analysis processing because the log analysis module 113 is included in the management server 130. FIG. 17 illustrates a log analysis processing procedure.

FIG. 17 is a sequential diagram illustrating an example of a log analysis processing procedure according to the second embodiment of this invention.

A navigation management module 131 first transmits a log analysis request to the log analysis module 113 (S1701).

The log analysis module 113 obtains status logs yet to be analyzed from the log DB 115 (S1702 and S1703). The log analysis module 113 executes preprocessing on the obtained status logs to generate combined logs (S1704). The log analysis module 113 executes importance calculation processing on each combined log (S1705) to carry out work log extraction processing (S1706). Lastly, the log analysis module 113 transmits an information collection work log sequence group to a work log collection module 132 (S1707).

Having received the information collection work log sequence group, the work log collection module 132 registers the information collection work log sequence group in a work log DB 140 (S1708 and S1709).

The preprocessing, the importance calculation processing, and the work log extraction processing are similar to those of the first embodiment.

According to the second embodiment of this invention, analyzing logs by the management server enables stable log analysis and navigation even when capacity of user's computer is insufficient.

Third Embodiment

According to the first and second embodiments, navigation information is generated by the management server to be transmitted to the computer. However, navigation contents can be generated by the computer.

Figure 18:
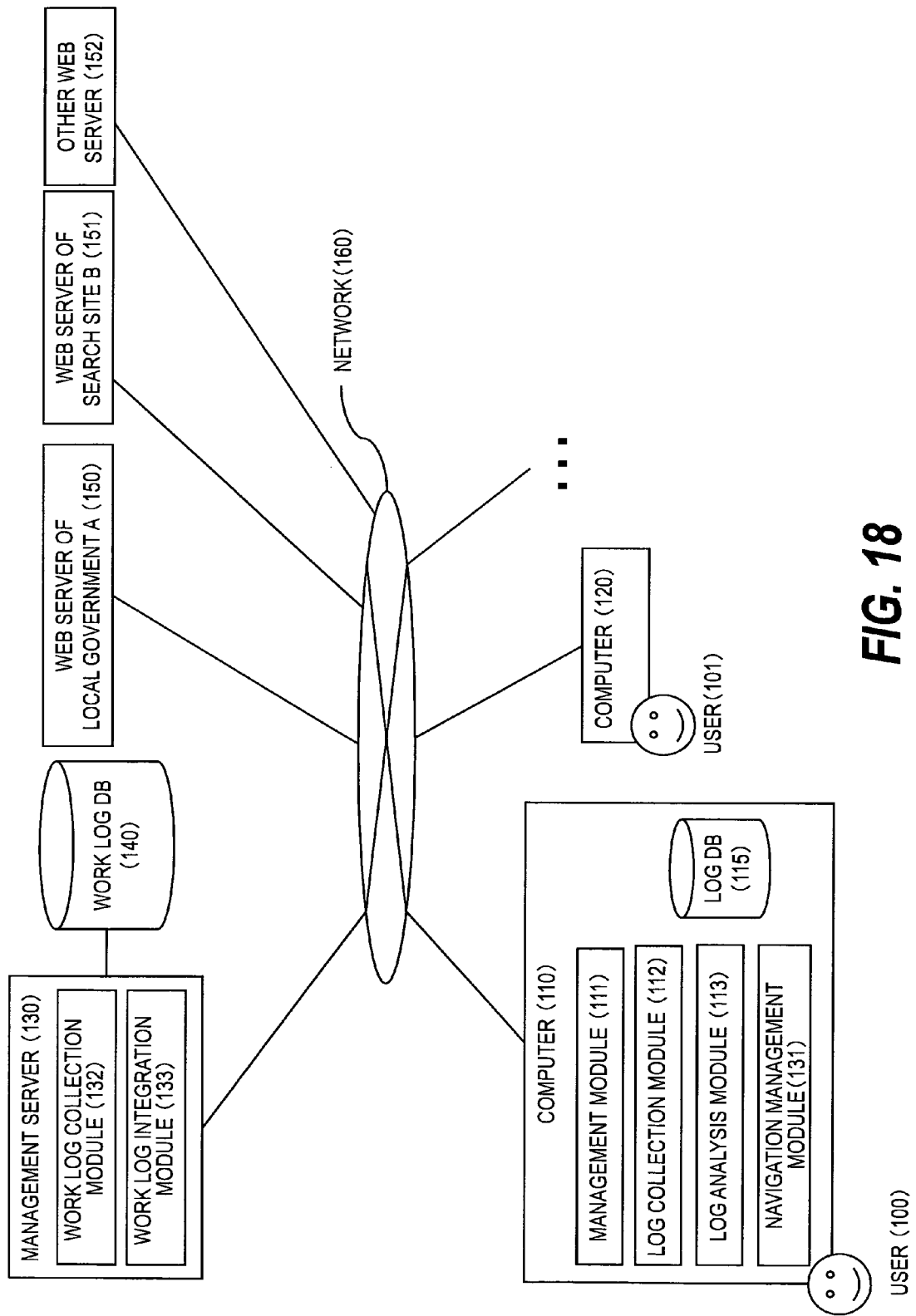
FIG. 18 is a block diagram of a computer system according to a third embodiment of this invention.

FIG. 18 is a block diagram of a computer system according to the third embodiment of this invention.

In the third embodiment, a computer 110 generates navigation contents. The computer 110 accordingly includes a navigation management module 131. Other components are similar to those of the first embodiment.

In the third embodiment, procedures of navigation processing for generating navigation contents, integration processing, and feedback processing for updating importance of an information collection work log sequence are similar to those of the first embodiment.

According to the third embodiment of this invention, navigation contents can be generated by user's computer. Thus, stable navigation can be realized without any dependence on a communication status of a network.

The preferred embodiments for carrying out this invention have been described by way of an example of information collection work by the user regarding the administrative procedure of the local government. However, this invention is not limited to information retrieval regarding the administrative procedure of the local government or the embodiments described above. Various changes can be made without departing from the spirit and scope of this invention.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, including a computer which is coupled to a server for providing requested information, and which collects the requested information, wherein the computer is configured to:
   obtain status histories including histories of operations to a screen of a web browser displayed on the computer and histories of operations to a screen of an application other than the web browser displayed on the computer, the status histories including information on the screen displayed on the computer;
   record the obtained status histories in chronological order to constitute a set of the status histories;
   divide, in a case where a history of an operation of switching between the screen of the web browser and the screen of the application other than the web browser is detected from the set of the status histories, the set of the status histories based on the history of the operation of switching between the screen of the web browser and the screen of the application other than the web browser;
   generate a plurality of combined histories in each of which corresponding status histories included in the divided set of the status histories are integrated based on screen information included in the status histories included in the divided set of the status histories, the plurality of combined histories each including an attribute which is set based on screen information on the corresponding integrated status histories of the combined history; and
   determine importance of each of the plurality of combined histories based on the attribute of the combined history and an importance of the combined history within consecutive combined histories of the plurality of combined histories, and
   wherein the plurality of combined histories include a pair of consecutive combined histories having a first combined history that includes histories of operations to the screen of the web browser and a second combined history that includes histories of operations to the application other than the web browser.

2. The computer system according to claim 1, further including a management server for managing navigation information to support collection of information by the computer, wherein:
   the computer is further configured to:
      extract a subset of the status histories recorded within a predetermined period of time;
      divide, in a case where the history of the operation of switching between the screen of the web browser and the screen of the application other than the web browser is detected from the extracted subset of the status histories, the extracted subset of the status histories based on the detected history of the operation of switching between the screen of the web browser and the screen of the application other than the web browser;
      generate a work history including a history of a work carried out to collect the requested information based on the divided subset of the status histories; and
      transmit the generated work history to the management server; and
   the management server is configured to:
      generate, based on the transmitted work history, the navigation information to support collection of the requested information; and
      provide the generated navigation information to the computer.

3. The computer system according to claim 2, wherein:
   the computer is further configured to:
      generate, based on the determined importance of each combined history, the work history by integrating the plurality of combined histories.

4. The computer system according to claim 3, wherein:
   the work history is added with importance which is set based on the importance of each of the integrated plurality of combined histories;
   the computer is further configured to notify the management server of usage of the navigation information including whether or not the requested information has been collected by using the navigation information; and
   the management server is further configured to update the importance added to the work history based on the notified usage.

5. The computer system according to claim 3, wherein:
the requested information is collected by referring to the screen displaying a page including the requested information by the computer;
the page includes a description for link to another page from the page;
the work history is correlated with at least one page, and is associated with a work history corresponding to the another page based on the link;
the navigation information is represented by a tree structure including a node corresponding to the work history, and a branch for linking the node corresponding to the work history with a node corresponding to the work history associated with the work history; and
the management server is further configured to provide the computer with a work history corresponding to a page displayed on the computer and the navigation information including the work history associated with the work history.

6. An information collection supporting device for providing a computer for collecting information by using a server which provides requested information with navigation information to support collection of the requested information, wherein the information collection supporting device is configured to:
obtain status histories including histories of operations to a screen of a web browser displayed on the computer and histories of operations to a screen of an application other than the web browser displayed on the computer, the status histories including information on the screen displayed on the computer;
record the obtained status histories in chronological order to constitute a set of the status histories;
divide, in a case where a history of an operation of switching between the screen of the web browser and the screen of the application other than the web browser is detected from the set of the status histories, the set of the status histories based on the history of the operation of switching between the screen of the web browser and the screen of the application other than the web browser;
generate a plurality of combined histories in each of which corresponding status histories included in the divided set of the status histories are integrated based on screen information included in the status histories included in the divided set of the status histories, the plurality of combined histories each including an attribute which is set based on screen information on the corresponding integrated status histories of the combined history; and
determine importance of each of the plurality of combined histories based on the attribute of the combined history and an importance of the combined history within consecutive combined histories of the plurality of combined histories, and
wherein the plurality of combined histories include a pair of consecutive combined histories having a first combined history that includes histories of operations to the screen of the web browser and a second combined history that includes histories of operations to the application other than the web browser.

7. The information collection supporting device according to claim 6, further configured to:
extract a subset of the status histories recorded within a predetermined period of time;
divide, in a case where the history of the operation of switching between the screen of the web browser and the screen of the application other than the web browser is detected from the extracted subset of the status histories, the extracted subset of the status histories based on the detected history of the operation of switching between the screen of the web browser and the screen of the application other than the web browser;
generate a work history including a history of a work carried out to collect the requested information based on the divided subset of the status histories;
generate, based on the generated work history, the navigation information to support collection of the requested information; and
provide the generated navigation information to the computer.

8. The information collection supporting device according to claim 7, wherein:
the information collection supporting device is further configured to:
generate the work history based on the determined importance of each combined history by integrating the plurality of combined histories.

9. The information collection supporting device according to claim 8, wherein:
the work history is added with importance which is set based on the importance of each of the integrated plurality of combined histories;
the information collection supporting device is further configured to:
receive usage of the navigation information including whether or not the information has been collected by the computer using the navigation information from the computer; and
update the importance added to the work history based on the received usage.

10. The requested information collection supporting device according to claim 8, wherein:
the requested information is collected by referring to the screen displaying a page including the information by the computer;
the page includes a description for link to another page from the page;
the work history is correlated with at least one page, and is associated with a work history corresponding to the another page based on the link;
the navigation information is represented by a tree structure including a node corresponding to the work history, and a branch for linking the node corresponding to the work history with a node corresponding to the work history associated with the work history; and
the information collection supporting device is further configured to provide the computer with a work history corresponding to a page displayed on the computer and the navigation information including the work history associated with the work history.

11. An information collection supporting method used in a computer system including:
a computer which is coupled to a server for providing requested information, and which collects the requested information; and
a management server for managing navigation information to support the collection of the requested information by the computer,
the information collection supporting method including the steps of:
obtaining status histories including histories of operations to a screen of a web browser displayed on the computer and histories of operations to a screen of an application other than the web browser displayed on the computer, the status histories including information on the screen displayed on the computer;

recording the obtained status histories in chronological order to constitute a set of the status histories;

dividing, in a case where a history of an operation of switching between the screen of the web browser and the screen of the application other than the web browser is detected from the set of the status histories, the set of the status histories based on the history of the operation of switching between the screen of the web browser and the screen of the application other than the web browser;

generating a plurality of combined histories in each of which corresponding status histories included in the divided set of the status histories are integrated based on screen information included in the status histories included in the divided set of the status histories, the plurality of combined histories each including an attribute which is set based on screen information on the corresponding integrated status histories of the combined history; and determining importance of each of the plurality of combined histories based on the attribute of the combined history and an importance of the combined history within consecutive combined histories of the plurality of combined histories, and wherein the plurality of combined histories include a pair of consecutive combined histories having a first combined history that includes histories of operations to the screen of the web browser and a second combined history that includes histories of operations to the application other than the web browser.

12. The information collection supporting method according to claim 11, further including the steps of:

extracting a subset of the status histories recorded within a predetermined period of time;

dividing, in a case where the history of the operation of switching between the screen of the web browser and the screen of the application other than the web browser is detected from the extracted subset of the status histories, the extracted subset of the status histories based on the detected history of the operation of switching between the screen of the web browser and the screen of the application other than the web browser;

generating a work history including a history of a work carried out to collect the requested information based on the divided subset of the status histories;

generating, based on the generated work history, navigation information to support collection of the requested information; and providing the generated navigation information to the computer.

13. The information collection supporting method according to claim 12, further comprising generating the work history based on the determined importance of each combined history by integrating the plurality of combined histories.

14. The information collection supporting method according to claim 13, wherein:

the work history is added with importance which is set based on the importance of each of the integrated plurality of combined histories; and the information collection supporting method further includes the steps of:

receiving usage of the navigation information including whether the requested information has been collected by the computer using the navigation information from the computer; and updating, by the computer, the importance added to the work history based on the received usage.

15. The information collection supporting method according to claim 13, wherein:

the requested information is collected by referring to the screen displaying a page including the requested information by the computer;

the page includes a description for link to another page from the page;

the work history is correlated with at least one page, and is associated with a work history corresponding to the another page based on the link;

the navigation information is represented by a tree structure including a node corresponding to the work history, and a branch for linking the node corresponding to the work history with a node corresponding to the work history associated with the work history; and the information collection supporting method further includes the step of providing the computer with a work history corresponding to a page displayed on the computer and the navigation information including the work history associated with the work history.

* * * * *